United States Patent
Suzuki et al.

(10) Patent No.: US 10,836,078 B2
(45) Date of Patent: Nov. 17, 2020

(54) MOLDED ARTICLE HAVING HOLE, AND METHOD FOR PRODUCING SAME

(71) Applicant: Teijin Limited, Osaka (JP)

(72) Inventors: Shuhei Suzuki, Osaka (JP); Hodaka Yokomizo, Osaka (JP)

(73) Assignee: Teijin Limited, Osaka (JP)

( * ) Notice: Subject to any disclaimer, the term of this patent is extended or adjusted under 35 U.S.C. 154(b) by 247 days.

(21) Appl. No.: 15/753,076

(22) PCT Filed: Jul. 19, 2016

(86) PCT No.: PCT/JP2016/071184
§ 371 (c)(1),
(2) Date: Feb. 15, 2018

(87) PCT Pub. No.: WO2017/043186
PCT Pub. Date: Mar. 16, 2017

(65) Prior Publication Data
US 2018/0236693 A1    Aug. 23, 2018

(30) Foreign Application Priority Data

Sep. 8, 2015   (JP) ................................ 2015-176617

(51) Int. Cl.
| | |
|---|---|
| *B29C 33/00* | (2006.01) |
| *B29C 43/34* | (2006.01) |
| *C08J 5/04* | (2006.01) |
| *B29C 70/46* | (2006.01) |
| *B29B 11/00* | (2006.01) |
| *B29B 11/08* | (2006.01) |
| *B29B 11/16* | (2006.01) |

(Continued)

(52) U.S. Cl.
CPC .......... *B29C 33/0033* (2013.01); *B29B 11/00* (2013.01); *B29B 11/08* (2013.01);
(Continued)

(58) Field of Classification Search
CPC ... B29C 33/0033; B29C 70/462; B29C 43/34; C08J 5/04; B29B 11/00; B29B 11/18;
(Continued)

(56) References Cited

U.S. PATENT DOCUMENTS 4,622,254 A * 11/1986 Nishimura ............ B29C 70/228
                                                                 428/102
5,759,592 A    6/1998 Piramoon et al.
(Continued)

FOREIGN PATENT DOCUMENTS

| JP | 2013010254 A | 1/2013 |
|---|---|---|
| JP | 2013203835 A | 10/2013 |

(Continued)

OTHER PUBLICATIONS

Onnnexus, Coefficients of Linear Thermal Expansion, accessed online Apr. 28, 2020.*

(Continued)

*Primary Examiner* — Camie S Thompson
(74) *Attorney, Agent, or Firm* — Banner & Witcoff, Ltd.

(57) ABSTRACT

A molded article including carbon fibers and thermoplastic resin, the molded article being provided with a hole h1, wherein the molded article has a region a around the hole h1, the relationship between the linear expansion coefficient C1 in the plate thickness direction in region a and the linear expansion coefficient C2 in a molded article region other than the region a is C1/C2<1, and the relationship of the carbon fiber volume fraction Vf1 of region a and the carbon fiber volume fraction Vf2 of a molded article region other than the region a is 0.2<Vf1/Vf2.

8 Claims, 6 Drawing Sheets

(51) Int. Cl.
*B29K 105/06* (2006.01)
*B29K 105/12* (2006.01)

(52) U.S. Cl.
CPC ............. *B29B 11/16* (2013.01); *B29C 43/34* (2013.01); *B29C 70/462* (2013.01); *C08J 5/04* (2013.01); *B29K 2105/06* (2013.01); *B29K 2105/12* (2013.01)

(58) Field of Classification Search
CPC ..... B29B 11/08; B29B 11/16; B29K 2105/06; B29K 2105/12
USPC ...................................... 428/292.1, 113, 119
See application file for complete search history.

(56) References Cited

U.S. PATENT DOCUMENTS

2007/0164481 A1* 7/2007 Polk ................. B29C 31/047
264/320
2012/0119060 A1 5/2012 Kuntz et al.
2013/0344282 A1* 12/2013 Yagi ..................... C08K 7/04
428/113

FOREIGN PATENT DOCUMENTS

| JP | 2014205354 A | 10/2014 |
| JP | 5687812 B1 | 1/2015 |
| WO | 2015012335 A1 | 1/2015 |

OTHER PUBLICATIONS

Oct. 18, 2016—(PCT/JP) International Search Report—App 2016/071184—Eng Tran.
Oct. 18, 2016—(PCT/JP) Written Opinion of the ISA—App 2016/071184—Eng Tran.
Oct. 4, 2018—(EP) Supplementary Search Report—App 16844051.9.

* cited by examiner

MOLDED ARTICLE HAVING HOLE, AND METHOD FOR PRODUCING SAME

CROSS REFERENCE TO RELATED APPLICATIONS

This is a U.S. National Phase Application under 35 U.S.C. § 371 of International Application No. PCT/JP2016/071184, filed Jul. 19, 2016, which claims priority to Japanese Application No. 2015-176617, filed Sep. 8, 2015, the entire contents of each of which are incorporated herein by reference.

TECHNICAL FIELD

The present invention relates to a molded article provided with a hole, the molded article including carbon fibers and a thermoplastic resin, and a method for producing the same.

BACKGROUND ART

In recent years, a so-called fiber-reinforced resin molded articles each including carbon fibers and a thermoplastic resin are attracting attention. These fiber-reinforced resin molded articles are excellent in mechanical properties owing to the presence of the carbon fibers in the thermoplastic resin and are attracting attention as structural materials for automobiles and the like. These fiber-reinforced resin molded articles can be molded into target shapes using compression molding or the like including cold pressing. Moreover, as the fiber-reinforced resin molded article, there is also well known a molded article having a hole at a part of the molded article.

As a method for producing such a fiber-reinforced resin molded article having a hole, for example, Patent Document 1 describes an invention where an opening part corresponding to an opening hole of the molded article is previously provided on a molding material, subsequently pre-heating is performed, and the molding material is subjected to compression molding to obtain the molded article.

Moreover, Patent Document 2 discloses a fastened structure wherein a peripheral part of a through hole is intentionally formed as a weak part and is made easy to destroy.

BACKGROUND ART DOCUMENTS

Patent Documents

Patent Document 1: JP-A-10-100175
Patent Document 2: JP-A-2015-44339

SUMMARY OF THE INVENTION

Problems to be Solved by the Invention

However, in the method described in Patent Document 1, at the time of flow molding of the molded article provided with an opening hole, the fibers contained in the molding material does not flow and a peripheral part of the opening hole is formed by a flow of the resin alone, so that the peripheral part of the opening hole becomes in a resin-rich state and thus the mechanical strength of the peripheral part of the opening hole decreases.

On the other hand, in the method described in Patent Document 2, since a linear expansion coefficient is the same in a peripheral part of the hole and in the other parts, it is difficult to locally improve dimensional stability of the hole part.

Accordingly, an object of the present invention is to provide a molded article having a hole in which both of the mechanical strength and the dimensional stability of the hole peripheral part are achieved, and a method for producing the same.

Means for Solving the Problems

For solving the above problems, the present invention provides the following means.

[1]

A molded article including carbon fibers and a thermoplastic resin, the molded article being provided with a hole h1, the molded article having a region a around the hole h1,
wherein a linear expansion coefficient C1 of the region a in the plate thickness direction and a linear expansion coefficient C2 of a molded article region other than the region a in the plate thickness direction satisfies a relation of C1/C2<1, and
a volume fraction Vf1 of the carbon fibers in the region a and a volume fraction Vf2 of the carbon fibers in the molded article region other than the region a satisfies a relation of 0.2<Vf1/Vf2.

[2]

The molded article according to [1], wherein the carbon fibers are discontinuous carbon fibers having a weight-average fiber length Lw and
the region a is a region surrounded with an inner wall face W1 of the hole h1 and an imaginary outer wall face W2 depicted in parallel to the inner wall face W1 in a position having a distance Lw from the inner wall face W1.

[3]

The molded article according to [1] or [2], wherein the volume fraction Vf1 of the carbon fibers in the region a and the volume fraction Vf2 of the carbon fibers in the molded article region other than the region a satisfies a relation of 0.2<Vf1/Vf2<1.2.

[4]

The molded article according to any one of [1] to [3], wherein the linear expansion coefficient Cm of the thermoplastic resin satisfies Cm/C2<1.

[5]

The molded article according to any one of [1] to [4], wherein the linear expansion coefficient C1 is $22 \times 10^{-5}$/° C. or less.

[6]

The molded article according to any one of [1] to [5], wherein the weight-average fiber length Lw of the carbon fibers is 1 to 100 mm.

[7]

The molded article according to [6], wherein the carbon fibers contained in the molded article region other than the region a are randomly dispersed in two-dimensions within in-plane directions; and
the molded article region other than the region a has a linear expansion coefficient C3 in the in-pane direction of more than 0 and $2.0 \times 10^{-5}$/° C. or less.

[8]

The molded article according to any one of [1] to [7], wherein, the carbon fibers contained in the molded article are mixture of carbon fiber bundles (A) each constituted by a critical single fibers of a critical single fiber number defined by the following formula (1) or more, and carbon fiber bundles (B1) each constituted by single fibers of less than the critical single fiber number and/or single carbon fibers (B2), a proportion of the carbon fiber bundles (A) to all the fibers is more than 5 Vol % and less than 99 Vol %, and an average number (N) of single fibers in the carbon fiber bundles (A) satisfies the requirement of the following formula (2):

$$\text{Critical single fiber number} = 600/D \quad (1)$$

$$0.6 \times 10^4/D^2 < N < 6 \times 10^5/D^2 \quad (2)$$

where D is an average fiber diameter (μm) of the carbon fibers.

[9]

A method for producing a molded article by cold pressing, the molded article including carbon fibers and a thermoplastic resin, the molded article being provided with a hole h1, the method including:

boring a hole h0 into a molding material having a thickness t; and disposing the molding material in a pair of male and female molds, at least one of the male and female molds having a hole-forming member for forming the hole h1, after the boring of the hole h0 so that the hole h0 corresponds to the hole-forming member, wherein at the time of disposing the molding material in the molds, an average distance Lf between an inner wall face W0 of the hole h0 of the molding material and the hole-forming member is 0<Lf<10 t, wherein the molded article has a region a around the hole h1, a linear expansion coefficient C1 of the region a in the plate thickness direction and a linear expansion coefficient C2 of a molded article region other than the region a in the plate thickness direction satisfies relation of C1/C2<1, and a volume fraction Vf1 of the carbon fibers in the region a and a volume fraction Vf2 of the carbon fibers in the molded article region other than the region a satisfies a relation of 0.2<Vf1/Vf2.

[10]

The method for producing a molded article according to [9], wherein, at the time of disposing the molding material in the molds, the average distance Lf between the inner wall face W0 of the hole h0 of the molding material and the hole-forming member is more than 0 mm and Lmax or less, wherein Lmax is a maximum fiber length of the carbon fibers.

[11]

The method for producing a molded article according to [9] or [10], wherein the carbon fibers are discontinuous carbon fibers having a weight-average fiber length Lw and the region a is a region surrounded with the inner wall face W1 of the hole h1 and an imaginary outer wall face W2 depicted in parallel to the inner wall face W1 in a position having a distance Lw from the inner wall face W1.

[12]

The method for producing a molded article according to any one of [9] to [11], wherein, at the time of disposing the molding material in the molds, the average distance Lf between the inner wall face W0 of the hole h0 of the molding material and the hole-forming member is one tenth or more of the maximum fiber length Lmax of the carbon fibers and Lmax or less.

[13]

The method for producing a molded article according to any one of [9] to [12], wherein a projection area of the hole h0 in a drawing direction of the molds is 101% or more and 2,000% or less with respect to a projection area of the hole-forming member in the drawing direction of the molds.

Advantage of the Invention

According to the molded article provided with a hole and the method for producing the same in the invention, the linear expansion coefficient of a hole peripheral part in the plate thickness direction can be designed to be low without decreasing the mechanical properties of the hole peripheral part, and the dimensional stability at the hole peripheral part in the plate thickness direction becomes excellent.

MODES FOR CARRYING OUT THE INVENTION

Figure 1:
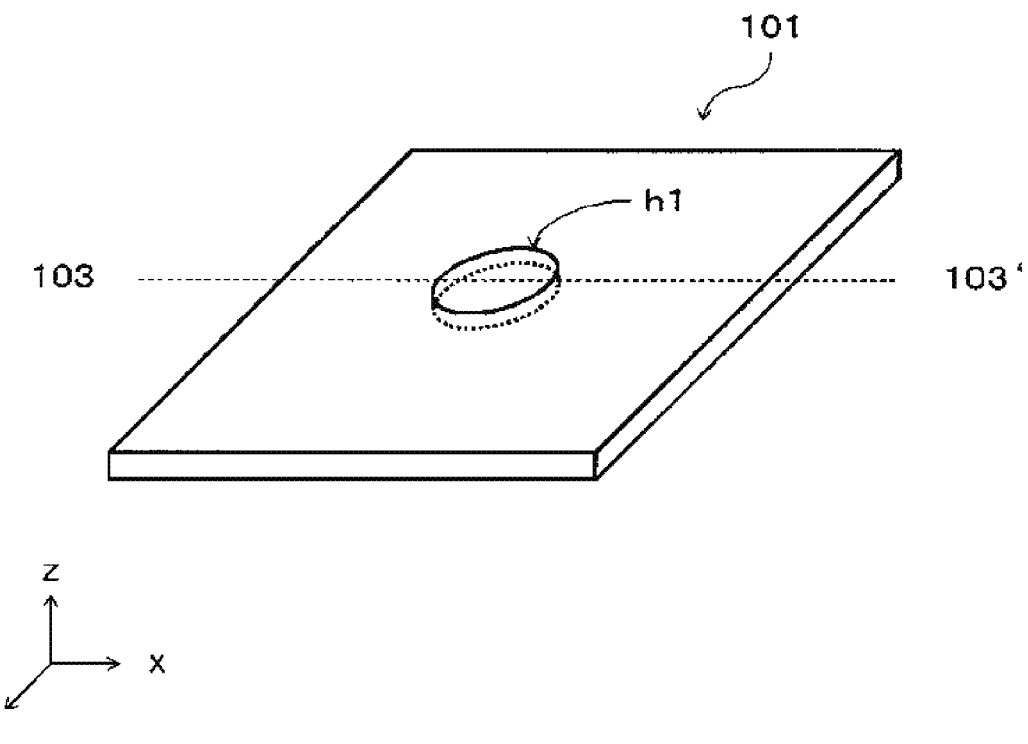
FIG. 1 is a schematic view illustrating an example of the molded article in the invention.

The "molding material" shown in the present description refers to a material before molding the molded article and is also simply referred to as "molding material".

[Carbon Fiber]

As the carbon fibers to be used in the present invention, there are generally known polyacrylonitrile (PAN)-based carbon fibers, petroleum-coal pitch-based carbon fibers, rayon-based carbon fibers, cellulose-based carbon fibers, lignin-based carbon fibers, phenol-based carbon fibers, vapor-grown carbon fibers, and the like. In the invention, carbon fibers of any of these types can be suitably used.

Of these, in the invention, from the viewpoint of excellent tensile strength, polyacrylonitrile (PAN)-based carbon fibers are preferably used. In the case of using PAN-based carbon fibers as the carbon fibers, the tensile modulus thereof is preferably in the range of 100 GPa to 600 GPa, more preferably in the range of 200 GPa to 500 GPa, even more preferably in the range of 230 GPa to 450 GPa. The tensile strength thereof is preferably in the range of 2,000 MPa to 10,000 MPa, more preferably in the range of 3,000 MPa to 8,000 MPa.

The carbon fibers to be used in the invention may be ones which have a sizing agent adherent to the surface thereof. In the case of using carbon fibers having a sizing agent adherent thereto, the type of the sizing agent can be suitably selected in accordance with the type of the carbon fibers and the type of the matrix resin, and is not particularly limited.

(Fiber Length)

The fiber length of the carbon fibers to be used in the invention is not particularly limited and continuous fibers and discontinuous carbon fibers can be used.

The carbon fibers to be used in the invention are preferably discontinuous carbon fibers having a weight-average fiber length Lw of 1 to 100 mm. The weight-average fiber length of the discontinuous carbon fibers is preferably 3 to 80 mm, and even more preferably 5 to 60 mm. When the weight-average fiber length is 100 mm or less, the flowability of the molding material is not decreased and a desirable molded article shape is obtained at the time of press molding. On the other hand, when the weight-average fiber length is 1 mm or more, the mechanical strength of the molded article is not decreased and thus the case is preferable. Moreover, the discontinuous carbon fibers having a weight-average fiber length Lw of 1 to 100 mm and continuous carbon fibers may be used in combination.

In the invention, carbon fibers which differ in fiber length from one another may be used in combination. In other words, the carbon fibers to be used in the invention may have a single peak or a plurality of peaks of the weight-average fiber length.

The average fiber length of the carbon fibers can be determined, for example, by randomly extracting 100 carbon fibers from the molded article, measuring the length of each of the carbon fibers with a vernier caliper or the like down to the order of 1 mm, and calculating the average length on the basis of the following formula (a).

Incidentally, when the length of each carbon fiber is expressed by Li and the number of carbon fibers measured is expressed by j, then the number-average fiber length (Ln) and the weight-average fiber length (Lw) are determined using the following formulae (a) and (b).

$$Ln=\Sigma Li/j \quad \text{Formula (a)}$$

$$Lw=(\Sigma Li^2)/(\Sigma Li) \quad \text{Formula (b)}$$

In the case where the fiber length is a constant length, the number-average fiber length and the weight-average fiber length become the same value.

The extraction of carbon fibers from the molded article can be conducted, for example, by subjecting the molded article to a heat treatment of about 500° C. for 1 hour to remove the resin in an oven.

(Fiber Diameter)

The fiber diameter of the carbon fibers to be used in the invention may be appropriately determined in accordance with the type of the carbon fibers, and is not particularly limited. Usually, the average fiber diameter is preferably in the range of 3 μm to 50 μm, more preferably in the range of 4 μm to 12 μm, even more preferably in the range of 5 μm to 8 μm. The average fiber diameter herein means the diameter of the single carbon fibers. Consequently, in the case of carbon fibers which are in the form of fiber bundles, that term means not the diameter of the fiber bundles but the diameter of the carbon fibers (single fibers) constituting the fiber bundles. The average fiber diameter of carbon fibers can be determined, for example, by the method described in JIS R-7607:2000.

(Volume FractionVolume Fraction of Carbon Fibers)

The volume fraction of the carbon fibers (hereinafter sometimes referred to simply as "Vf") contained in the molded article (the whole molded article including both of the region a and the molded article region other than the region a), defined by the following formula(c), is not particularly limited but the volume fraction (Vf) of the carbon fibers in the molded article is preferably 10 to 60 Vol %, more preferably 20 to 50 Vol %, even more preferably 25 to 45 Vol %.

$$\text{Volume fraction of the carbon fibers (Vf)}=100\times[(\text{Volume of carbon fibers})/(\text{Volume of carbon fibers}+\text{Volume of thermoplastic resin})] \quad \text{Formula (c)}$$

In the case where the volume fraction (Vf) of the carbon fibers in the molded article is 10 Vol % or more, desired mechanical properties are easily obtained. On the other hand, in the case where the volume fraction (Vf) of the carbon fibers in the molded article does not exceed 60 Vol %, flowability at the time of the use in press molding or the like is satisfactory and a desired molded article shape is easily obtained.

Incidentally, the relationship between the volume fraction Vf1 of the carbon fibers in the region a and the volume fraction Vf2 of the carbon fibers in the molded article region other than the region a will be mentioned later.

[Areal Weight]

The areal weight of the carbon fibers in the molded article is not particularly limited. However, the areal weight is usually 25 g/m² to 10,000 g/m².

[Fiber Form]

Regardless of the type of the carbon fibers, the carbon fibers to be used in the invention may be in a single fiber form composed of a single fiber or may be in the form of fiber bundles each composed of a plurality of single fibers.

The carbon fibers to be used in the invention may contain ones in the form of fiber bundles. In the case of using carbon fibers in the form of fiber bundles, the number of single fibers constituting each fiber bundle may be substantially even in each fiber bundle or may be different from one another.

In the case where the carbon fibers to be used in the invention are in the form of fiber bundles, the number of the single fibers constituting each fiber bundle is not particularly limited. However, the number thereof is usually in the range of 1,000 to 100,000.

In general, carbon fibers are available in the form of fiber bundles each composed of several thousands to tens of thousands of filaments gathered together. When the carbon fibers are used as such, portions where fiber bundles are entangled become locally thick and thus it is sometimes difficult to obtain a thin molded article. Therefore, such carbon fibers are usually used after the fiber bundles are widened or opened.

In the case of opening the fiber bundles before use, a degree of opening in the opened fiber bundles is not particularly limited. It is, however, preferred to control the degree of opening in the fiber bundles so that the carbon fibers to be used include carbon fiber bundles each composed of a specific number or more of carbon fibers and carbon fibers (single fibers) or carbon fiber bundles each composed of less than the specific number of carbon fibers. In this case, specifically, carbon fiber bundles (A) each constituted by single fibers of a critical single fiber number or more, the critical single fiber number being defined by the following formula (1), and carbon fiber bundles (B1) each constituted by single fibers of less than the critical single fiber number and/or single carbon fibers (B2) are mixed, and the proportion of the carbon fiber bundles (A) to all the fibers is preferably more than 0 Vol % to 99 Vol %, more preferably more than 5 Vol % to 99 Vol %, even more preferably 20 Vol % or more to less than 99 Vol %, particularly preferably 30 Vol % or more to less than 95 Vol %. It is preferred that the proportion of the carbon fiber bundles (A) to the total amount of the fibers falls within the above range. Further, the average number (N) of single fibers in the carbon fiber bundles (A) preferably satisfies the following formula (2).

$$\text{Critical single fiber number}=600/D \quad (1)$$

$$0.6\times10^4/D^2<N<6\times10^5/D^2 \quad (2)$$

wherein D is the average fiber diameter (μm) of the carbon fibers.

As mentioned above, when the carbon fiber bundles each composed of a specific number or more of carbon fibers and the opened carbon fibers or carbon fiber bundles other than the above bundles are made co-present in a specific ratio, it becomes possible to increase the content of the carbon fibers in the molded article, i.e., the volume fraction (Vf) of the fibers, so that the case is preferable.

Moreover, in the case where the average number (N) of single fibers in the carbon fiber bundles (A) is larger than $0.6 \times 10^4/D^2$, a higher volume fraction (Vf) of the carbon fibers is easily obtained and thus a fiber-reinforced plastic having an excellent strength is easily obtained. Furthermore, in the case where the average number (N) of single fibers in the carbon fiber bundles (A) is smaller than $6 \times 10^5/D^2$, a locally thick part is less prone to be generated and voids are less prone to occur. A more preferred range of the average number (N) of single fibers is $0.6 \times 10^4/D^2 < N < 1 \times 10^5/D^2$.

(Two-Dimensionally Random)

The carbon fibers contained in the molded article region other than the region a are preferably dispersed randomly in two-dimensions within in-plane directions of the molded article. However, it is not necessary that the carbon fibers are randomly dispersed in two dimensions over the all range of the molded article region other than the region a and the carbon fibers may be randomly dispersed in two dimensions in a partial range.

The phrase "randomly dispersed in two dimensions" herein means a state that the carbon fibers are oriented disorderly, without being aligned in any specific direction(s), in the in-plane directions of the molded article and have been arranged without showing any specific directional properties as a whole. A molded article obtained using such discontinuous fibers randomly dispersed in two dimensions is a substantially isotropic molding material having no in-plane anisotropy.

Moreover, the in-plane directions of a molded article are directions (XY directions in FIG. 1 and FIG. 4) which are perpendicular to the plate thickness direction of the molded article. In contrast to the longitudinal direction or transverse direction, which indicates a definite direction, the term "in-plane directions" means indefinite directions in the same plane (parallel plane perpendicular to the plate thickness direction).

Figure 2:
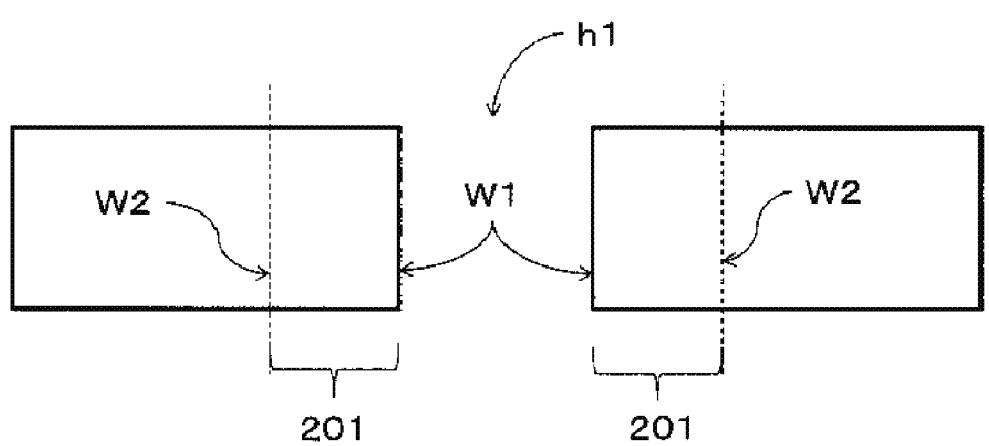
FIG. 2 is a cross-sectional view of "103-103'" in FIG. 1.
Figure 4:
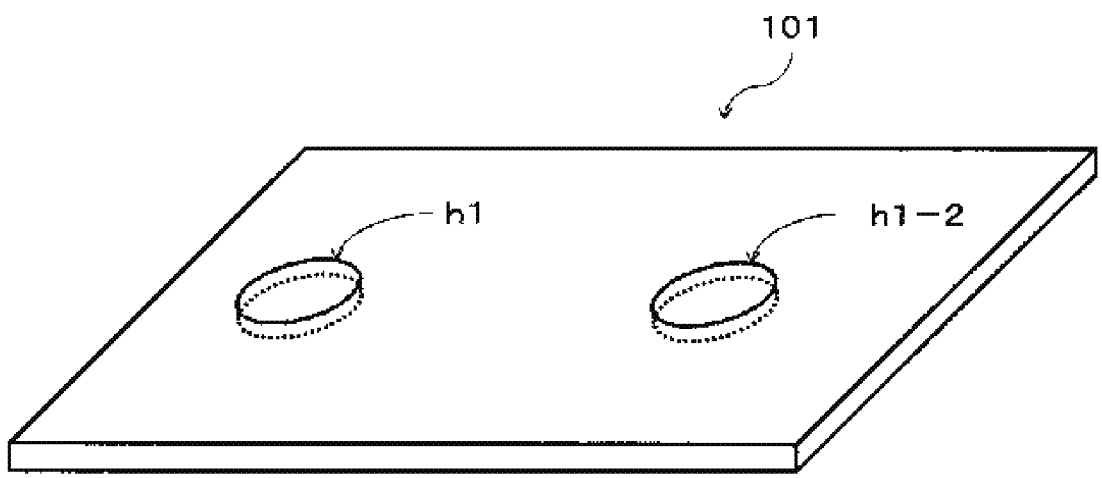
FIG. 4 is a schematic view illustrating an example of the molded article having two holes.
Figure 4:
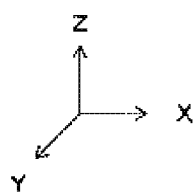

In the molded article of the invention, the plate thickness direction is a thickness direction of the molded article and the Z direction shown in FIG. 1, FIG. 2, and FIG. 4. In the case where plural thickness directions are present depending on the shape of the molded article, the direction is a direction in which the objective hole h1 extends.

Incidentally, the degree of orientation of the two-dimensionally random state is evaluated by determining a ratio of tensile moduli of two directions perpendicular to each other. Of the values of the tensile moduli measured with respect to an arbitrary direction of the molded article and a direction perpendicular to the arbitrary direction, when a ratio (Eδ) obtained by dividing a larger value by a smaller value is 2 or less, more preferably 1.5 or less, even more preferably 1.3 or less, it can be evaluated that the carbon fibers are randomly dispersed in two dimensions.

In the case where the carbon fibers are randomly dispersed in two dimensions, when a molded article having a second hole h1-2 is produced, positional accuracy of the distance between the two holes is extremely improved as compared with the case where the holes are provided by cutting.

[Thermoplastic Resin]

The thermoplastic resin to be used in the invention is not particularly limited and one having a desired softening point or melting point can be suitably selected and used in accordance with, for example, applications of the molded article.

As the thermoplastic resin, use is usually made of one having a softening point in the range of 180° C. to 350° C. However, the thermoplastic resin to be used is not limited thereto.

Examples of the thermoplastic resin include polyolefin-based resins such as polyethylene resins, polypropylene resins, polybutadiene resins, polymethylpentene resins, vinyl chloride resins, vinylidene chloride resins, vinyl acetate resins, and poly(vinyl alcohol) resins, styrene-based resins such as polystyrene resins, acrylonitrile/styrene resins (AS resins), and acrylonitrile/butadiene/styrene resins (ABS resins), polyamide-based resins such as polyamide-6 resins (nylon-6), polyamide-11 resins (nylon-11), polyamide-12 resins (nylon-12), polyamide-46 resins (nylon-46), polyamide-66 resins (nylon-66), and polyamide-610 resins (nylon-610), polyester resins such as poly(ethylene terephthalate) resins, poly(ethylene naphthalate) resins, poly(butylene terephthalate) resins, poly(trimethylene terephthalate) resins, and liquid-crystal polyesters, polyacetal resins, polycarbonate resins, polyoxymethylene resins, (meth)acrylic resins such as poly(methyl methacrylate), polyarylate resins, poly(phenylene ether) resins, modified poly(phenylene ether) resins, thermoplastic polyimide resins, poly(amide-imide) resins, polyetherimide resins, polyethernitrile resins, phenoxy resins, poly(phenylene sulfide) resins, polysulfone resins, modified polysulfone resins, poly(ether sulfone) resins, polyketone resins, polyetherketone resins, polyetheretherketone resins, polyetherketoneketone resins, urethane resins, fluororesins such as polytetrafluoroethylene, and polybenzimidazole resins.

One thermoplastic resin alone may be used as the thermoplastic resin in the invention, or two or more thermoplastic resins may be used in the invention. Examples of the embodiment in which two or more thermoplastic resins are used in combination include an embodiment in which thermoplastic resins differing in softening point or melting point are used in combination and an embodiment in which thermoplastic resins differing in average molecular weight are used in combination. However, the embodiment is not limited thereto.

[Production Method of Molding Material]

The molding material to be used in the invention can be produced by using a generally known method. For example, a two-dimensional random arrangement mat that is a molding material precursor and a method for producing the same are precisely described in U.S. Pat. No. 8,946,342 and JP2013-49208A.

[Molded Article]

The molded article in the invention is a molded article including carbon fibers and a thermoplastic resin, the molded article provided with a hole h1, wherein the molded article has a region a around the hole h1, wherein a linear expansion coefficient C1 of the region a in the plate thickness direction and a linear expansion coefficient C2 of a molded article region other than the region a in the plate thickness direction satisfies a relation of C1/C2<1.

(Hole h1)

The hole h1 in the invention is a hole provided with being opened toward the plate thickness direction of the molded article and, for example, a hole shown by h1 in FIG. 1 may be mentioned. The hole h1 is preferably a through hole.

The shape of the hole h1 is not particularly limited and the shape of the hole viewed from the plate thickness direction may be, for example, circular, elliptic, any of various polygonal shapes such as triangular shape or rectangular shape, or an indefinite shape. A preferable shape is a circular, elliptic, or triangular shape and a more preferable shape is a circular shape. Moreover, in the case where the shape is a circular shape, although it depends on the hole-forming member to be mentioned later, the shape is preferably a circular shape having a diameter of 1 mm or more and 100 mm or less, more preferably a circular shape having a diameter of 5 mm or more and 50 mm or less.

The role of the hole h1 is not particularly limited but, for example, there are a role of making a fastening rod pass through the hole, a role for determining a reference position, a role for avoiding the interference with another member, and other roles.

(Region a)

The region a defined in the invention is a region surrounded with an inner wall face W1 of the hole h1 and an imaginary outer wall face W2 depicted in parallel to the inner wall face W1 in the position having a distance Lw (Lw is a weight-average fiber length of the carbon fibers contained in the molded article) from the inner wall face W1 (e.g., 201 in FIG. 2).

The region a is preferably a region surrounded with an inner wall face W1 of the hole h1 and an imaginary outer wall face W2 depicted in parallel to the inner wall face W1 in the position of 20 mm from the inner wall face W1.

In an arbitrary face in the in-plane directions of the molded article, a figure formed by the inner wall face W1 and a figure formed by the imaginary outer wall face W2, which are viewed in the plate thickness direction, are similar to each other.

Moreover, the region a is a region that continues from the inner wall face W1 of the hole h1 and the region a includes portions where the carbon fibers are oriented in three dimensions.

(Linear Expansion Coefficient in Plate Thickness Direction)

In the invention, the linear expansion coefficient C1 of the region a in the plate thickness direction and the linear expansion coefficient C2 of the molded article region other than the region a in the plate thickness direction satisfies a relation of C1/C2<1.

The linear expansion coefficient is a proportion of a ratio of expansion or contraction of an object caused by an increase or a decrease of temperature to a temperature change, particularly represents a change of length, and is shown by strain per unit temperature. The unit is represented by /° C. or %/° C. It is also called as a coefficient of linear expansion. Incidentally, the measurement of the linear expansion coefficient may be conducted as follows after a test specimen is vacuum-dried at 110° C. for 24 hours as a pre-treatment.

Shape of the test specimen: a sample is cut out in a rectangular parallelepiped shape of plate thickness direction×in-plane direction×in-plane direction and is compressed (measured) in the plate thickness direction. The plate thickness direction is the Z direction in FIG. 1, FIG. 2, and FIG. 4.

Model of testing machine: TMA/SS7100 (manufactured by Seiko Instruments Inc.)

Temperature increasing rate: 5° C./min
Test load: compression load of 49 mN
Probe diameter: 2.9 mm
Measurement atmosphere: under nitrogen atmosphere (100 ml/min)
Test temperature range: 25 to 200° C.

(Relationship of Linear Expansion Coefficient in Plate Thickness Direction)

In the case of C1/C2<1, dimensional stability is improved in the region a that is a periphery of the hole h1. Conventionally, only the linear expansion coefficient of the whole molded article is controlled but, in the invention, the linear expansion coefficient is lowered only in the region a that is a periphery of the hole h1, as compared with the linear expansion coefficient of the whole molded article. This is extremely advantageous on production since the linear expansion coefficient may be controlled locally at the peripheral part of the hole, as compared with the case where the dimensional stability in the plate thickness direction of the whole molded article is improved.

A specific method for achieving C1/C2<1 is not particularly limited but there may be mentioned a method where the hole h0 is provided on the molding material as mentioned later and the molding material is made flow at the time of molding to form the hole h1 and a method where the hole h1 is provided by specifically using a resin having a low linear expansion coefficient only in the region a or by intentionally orienting the carbon fibers toward the plate thickness direction only in the region a.

In view of convenience of the production method, it is preferred that the hole h0 is provided on the molding material as mentioned later and the molding material is made flow at the time of molding to form the hole h1.

The C1/C2 preferably satisfies C1/C2<0.9, more preferably C1/C2<0.7, even more preferably C1/C2<0.5, most preferably C1/C2<0.3.

A specific value of the linear expansion coefficient C1 is not particularly limited but is preferably $22 \times 10^{-5}$/° C. or less, more preferably $15 \times 10^{-5}$/° C. or less, even more preferably $10 \times 10^{-5}$/° C. or less. When the linear expansion coefficient C1 is $22 \times 10^{-5}$/° C. or less, for example, in the case where a fastening rod such as a resin rivet is inserted into the hole h1 and fastening is conducted, fastening is stabilized.

(Linear Expansion Coefficient of Thermoplastic Resin)

The linear expansion coefficient C2 in the invention preferably satisfies Cm/C2<1, wherein Cm represents the linear expansion coefficient of the thermoplastic resin.

The fact that the linear expansion coefficient C2 is larger than the linear expansion coefficient Cm means that the linear expansion coefficient in the plate thickness direction is increased by incorporating the carbon fibers into the thermoplastic resin.

As reasons for satisfying Cm/C2<1, the present inventors consider the following (i) and (ii).

(i) It is because, in the case where the carbon fibers are not oriented in the plate thickness direction and are dispersed toward one direction or dispersed anisotropically in the in-plane directions or randomly dispersed in two dimensions in the in-plane directions, the thermoplastic resin is difficult to expand toward the orientation direction of the carbon fibers in the molded article region other than the region a and thus the thermoplastic resin actively expands toward the plate thickness direction.

(ii) It is because, in the case where the carbon fibers are discontinuous carbon fibers, the carbon fibers easily expand toward the plate thickness direction by springback in the molded article region other than the region a. Incidentally, the "springback" is a phenomenon that, in an assembly of compressed and fixed carbon fibers, when the fixing is lost or weakened, the assembly intends to return to the state before the compression.

By the fact satisfying Cm/C2<1, for example, in the case where a fastened article is manufactured using the molded article in the invention, there is exhibited an extremely qualitatively different effect that a sealing effect under a high temperature is increased in a clearance of the molded articles while maintaining the dimensional stability at the periphery (region a) of the hole h1.

Figure 6:
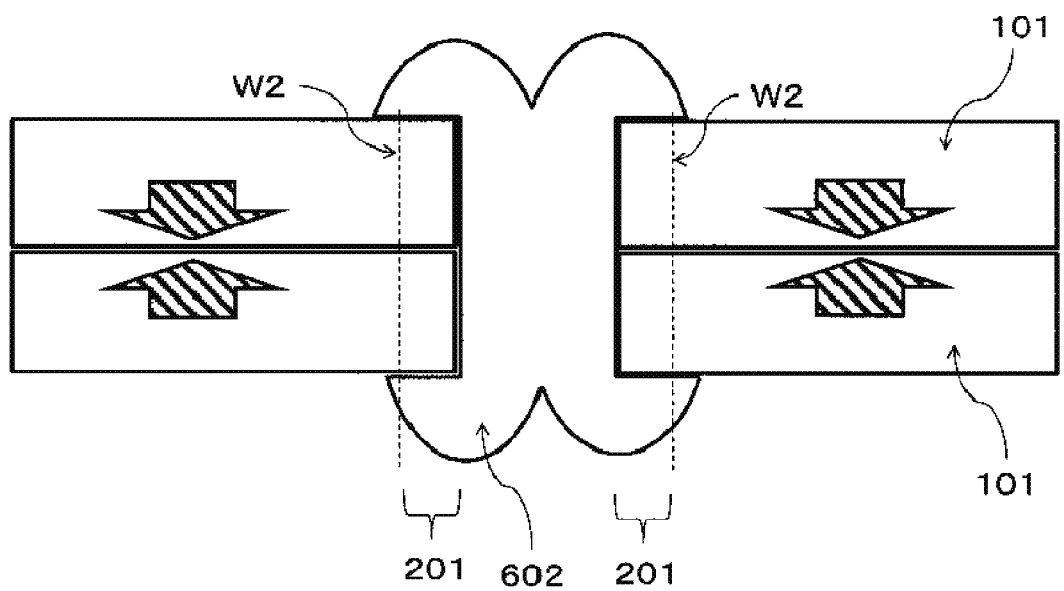
FIG. 6 is a schematic view where two molded articles each provided with a hole h1 in the invention are overlaid and fastened.

FIG. 6 shows a specific example. FIG. 6 represents a cross-sectional schematic view where the holes h1 of two molded articles of the invention are overlaid and fastened with a rivet. In the fastened article drawn in FIG. 6 (601 in FIG. 6), two molded articles (101 in FIG. 6) respectively provided with a hole h1 of the invention are prepared and laminated so that the holes h1 are overlaid, subsequently a rivet made of a resin or the like (602 in FIG. 6) is inserted into the holes h1, and the two molded articles are caulked and fastened. At this time, since the caulking and fastening are conducted at a portion including the region a, the dimensional stability of the periphery of the fastened part in the plate thickness direction is excellent. On the other hand, in the molded article region other than the region a, the molded article is prone to expand in the plate thickness direction particularly under a high-temperature region (arrow direction in FIG. 6). Thereby, the clearance between the molded articles (101 in FIG. 6) is narrowed and thus the sealing effect at the fastened article is increased.

Incidentally, the linear expansion coefficient of a thermosetting resin is very small as compared to the linear expansion coefficient of a thermoplastic resin.

(Linear Expansion Coefficient C3 in In-Plane Directions)

In the molded article in the invention, it is preferred that the carbon fibers contained in the molded article region other than the region a are randomly dispersed in two dimensions in the in-plane directions and the linear expansion coefficient C3 of the molded article region other than the region a in the in-pane direction is more than 0 and $2.0 \times 10^{-5}/°$ C. or less. The linear expansion coefficient C3 in the in-plane directions is more preferably $0.10 \times 10^{-5}/°$ C. or more and $2.0 \times 10^{-5}/°$ C. or less. Within this range, in the case where a molded article having the second hole h1-2 is produced, an excellent effect is exhibited in view that the positioning of the hole becomes easy (the in-plane directions are XY directions in FIG. 1 and FIG. 4).

However, it is not necessary that the linear expansion coefficient in the in-plane directions falls within the above range in the whole range of the molded article region other than the region a, and the molded article may be one where the linear expansion coefficient partially falls within the above range.

The hole h1-2 is another new hole different from the hole h1 and, for example, refers to h1-2 in FIG. 4.

Incidentally, as for the measurement of the linear expansion coefficient C3 in the in-plane directions, in the method for measuring the linear expansion coefficient in the plate thickness direction as mentioned above, it is sufficient to measure it with changing the compression direction (measurement direction) to an in-plane direction.

(Thickness of Molded Article)

The thickness of the molded article of the invention is not particularly limited but usually, is preferably in the range of 0.01 mm to 100 mm, more preferably in the range of 0.01 mm to 10.0 mm, even more preferably in the range of 0.1 mm to 5.0 mm.

Moreover, the relationship between the thickness T1 of the molded article in the region a and the thickness T2 of the molded article in the molded article region other than the region a is not particularly limited but preferably satisfies 0.5<T1/T2<1.5, preferably 0.8<T1/T2<1.2, and even more preferably 0.9<T1/T2<1.1 (substantially the same thickness).

In the case where the molded article to be used in the invention has a configuration that a plurality of layers are laminated, the above thickness does not refer to the thickness of each layer and refers to the thickness of the whole molded article with summing up the thickness of each layer.

The molded article to be used in the invention may have a single layer structure composed of a single layer or may have a laminated structure where a plurality of layers are laminated.

The embodiment where the molded article has the above laminated structure may be an embodiment where a plurality of layers having the same composition are laminated or an embodiment where a plurality of layers having compositions different from one another are laminated.

(Relationship Between Volume Fraction Vf1 of Carbon Fibers in Region a and Volume Fraction Vf2 of Carbon Fibers in Molded Article Region Other than Region a)

In the invention, the volume fraction (Vf) of the carbon fibers contained in the molded article is not particularly limited as mentioned above but the volume fraction Vf1 of the carbon fibers in the region a and the volume fraction Vf2 of the carbon fibers in the molded article region other than the region a satisfies a relation of 0.2<Vf1/Vf2.

When 0.2<Vf1/Vf2 is satisfied, the mechanical strength of the region a is good, while when 0.2≥Vf1/Vf2 is satisfied (the region a is rich in the resin), the fibers around the hole is insufficient, so that the dimensional accuracy of the hole itself decreases.

The Vf1/Vf2 preferably satisfies a relation of 0.2<Vf1/Vf2<1.2, more preferably 0.5<Vf1/Vf2≤1.0.

Incidentally, in the case where molding is performed by paper-making method or the like using a molding material in a state that the carbon fibers are completely opened, the region a becomes rich in the resin and the mechanical strength of the fastened part decreases.

[Method for Producing Molded Article (Cold Pressing Method)]

As a preferable molding method for producing the molded article of the invention, press-molding using a cold pressing is utilized.

In the cold pressing method, for example, a molding material heated up to a first predetermined temperature is charged into a mold set at a second predetermined temperature, and then pressurized and cooled.

Specifically, in the case where the thermoplastic resin constituting the molding material is crystalline, the first predetermined temperature is the melting temperature or higher and the second predetermined temperature is lower than the melting temperature. When the thermoplastic resin is amorphous, the first predetermined temperature is the glass transition temperature or higher and the second predetermined temperature is lower than the glass transition temperature.

That is, the cold pressing method includes at least the following steps A-1) and A-2).

Step A-1): a step of heating the molding material up to a temperature in a range of the melting temperature to decomposition temperature of thermoplastic resin when the resin is crystalline, while in a range of the glass transition temperature to decomposition temperature when the resin is amorphous.

Step A-2): a step of disposing the molding material heated in the step A-1) in a mold adjusted to a temperature lower than the melting temperature of thermoplastic resin when the resin is crystalline, while a temperature lower than the glass transition temperature when the resin is amorphous, and applying pressure to the mold.

By carrying out these steps, the molding of the molding material can be completed.

Incidentally, at the time of charging into a mold, one (single) or two or more molding materials can be used to suit the plate thickness of a target molded article. In the case of using two or more molding materials, two or more molding materials may be laminated in advance and heated, or heated molding materials may be laminated and then charged into a mold, or the heated molding materials may be laminated in a mold one by one. Meanwhile, in the case of laminating two or more molding materials, the smaller a difference in temperature between the bottom layer of the molding material and the top layer of composite material is preferable. From this point of view, the lamination is preferably carried out before charging the molding materials into the mold.

Although it is necessary for the foregoing steps to be carried out in the above-described order, another step may be provided between those steps. As an example of such another step, there may be mentioned a shaping step wherein the molding material is shaped into the shape of the cavity of the mold to be used in the step A-2) in advance before the step A-2) by the use of a shaping mold other than the mold to be used in the step A-2).

Moreover, the step A-2) is a step of applying pressure to the molding material to obtain a molded article having a desired shape. The molding pressure at this time is not particularly limited but is preferably less than 20 MPa, more preferably 10 MPa or less.

Furthermore, as a matter of course, various steps may be inserted between the above steps at the press molding and, for example, vacuum compression molding where press molding is performed while achieving vacuum may be used.

[Method for Producing Molded Article]

The method for producing the molded article of the invention is preferably a method for producing a molded article by cold pressing, the molded article including carbon fibers and a thermoplastic resin, the molded article being provided with a hole h1, wherein the method includes:

boring a hole h0 into a molding material having a thickness t; and disposing the molding material in a pair of male and female molds, at least one of the male and female molds having a hole-forming member for forming the hole h1, after the boring of the hole h0 so that the hole h0 corresponds to the hole-forming member, wherein at the time of disposing the molding material in the molds, an average distance Lf between an inner wall face W0 of the hole h0 of the molding material and the hole-forming member is 0<Lf<10 t, wherein the molded article has a region a around the hole h1, a linear expansion coefficient C1 of the region a in the plate thickness direction and a linear expansion coefficient C2 of a molded article region other than the region a in the plate thickness direction satisfies a relation of C1/C2<1, and a volume fraction Vf1 of the carbon fibers in the region a and the volume fraction Vf2 of the carbon fibers in the molded article region other than the region a satisfies a relation of 0.2<Vf1/Vf2.

Moreover, the method for producing the molded article of the invention is a method for producing a molded article by cold pressing, the molded article including carbon fibers having a maximum fiber length Lmax and a thermoplastic resin, the molded article being provided with a hole h1, wherein the method includes:

boring a hole h0 into a molding material; and disposing the molding material in a pair of male and female molds, at least one of the male and female molds having a hole-forming member for forming the hole h1, after the boring of the hole h0 so that the hole h0 corresponds to the hole-forming member, wherein at the time of disposing the molding material in the molds, an average distance between an inner wall face W0 of the hole h0 of the molding material and the hole-forming member is preferably set to more than 0 and Lmax or less, provided that the molded article has a region a around the hole h1, the linear expansion coefficient C1 of the region a in the plate thickness direction and the linear expansion coefficient C2 of the molded article region other than the region a in the plate thickness direction satisfies C1/C2<1, and the volume fraction Vf1 of the carbon fibers in the region a and the volume fraction Vf2 of the carbon fibers in the molded article region other than the region a satisfies 0.2<Vf1/Vf2.

The method for producing a molded article of the invention is excellent in accuracy of the hole h1 to be formed.

(Hole h0 of Molding Material)

Figure 3A:
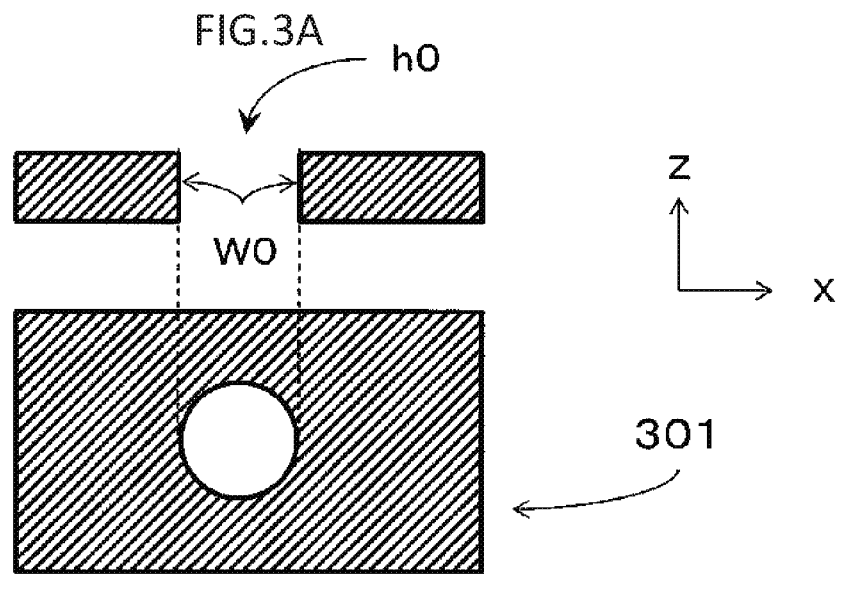
FIG. 3 is a schematic view illustrating a method for producing an example of the molded article.

The hole h0 of the molding material is an open hole h0 previously provided at a place corresponding to the hole h1 of the molded article. For example, it is a hole h0 shown in FIG. 3A.

As a means for providing the hole h0 on the molding material, a cutting tool such as a pierce die, a Thomson blade, a drill, or an end mill, water jetting, or laser cutting can be used.

(Production Example of Molded Article Provided with Hole h1)

Figure 3B:
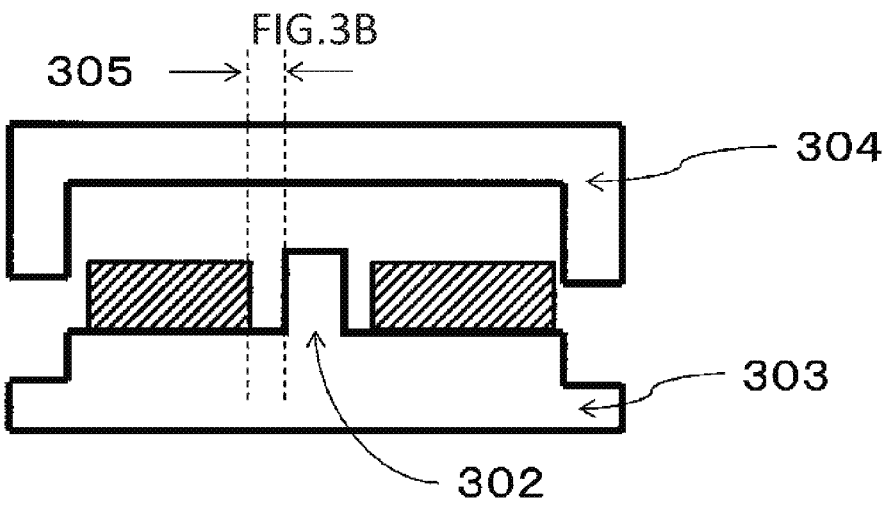
Figure 3C:
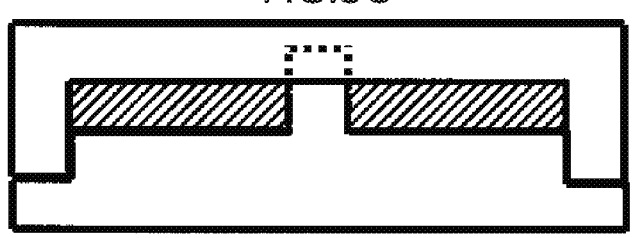
Figure 3D:
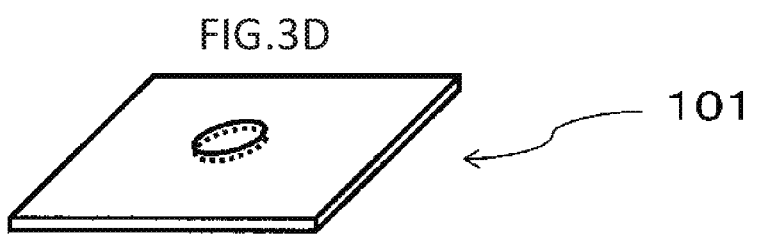

The hole-forming member for forming the hole h1 at a desired position of the molded article may be provided on at least either one of a pair of male and female molds (i.e., an upper mold or a lower mold), and, for example, a protrusion (302) of a lower mold as shown in FIG. 3B can be exemplified. Incidentally, the hole-forming member is provided by disposing a pin on the mold and is called a core pin in some cases.

An example of the mold for producing the molded article is shown in FIG. 3 as a cross-sectional view thereof. The mold is composed of a pair of female and male molds (303, 304), i.e., an upper mold and a lower mold attached to a pressing device (not shown in the figure), and usually, one of them, optionally both of them are movable to the opening and closing direction of the molds (in the figure, the male mold is fixed and the female mold is movable).

These molds each have a cavity face corresponding to a product shape. In FIG. 3, as a hole-forming member for forming an opening in a predetermined position, a hole-forming member which is movable to the opening and closing direction of the molds in the molds and has the same cross-sectional shape as the target hole h1 of the molded article is provided corresponding to the position of the target hole h1 of the molded article.

The mold on which the hole-forming member is provided may be any of the male and female molds but, for facilitating the supply of the molding material that is in a softened state by pre-heating, it is preferred to provide the hole-forming member on the mold at the side to which the molding material is disposed. Moreover, in some cases, the hole-forming members may be provided on both of the male and female molds so that the end faces of the hole-forming members come into contact while they face to each other.

Hereinafter, the method of the invention in the case of using molds shown in FIG. 3 will be described. Both male and female molds (303, 304) are made in an open state and a molding material (301) is placed on a cavity face of the male mold (303). In the position corresponding to a hole-forming member (302) provided on the mold, the hole h0 having a projection area larger than the projection area of the hole-forming member (302) is provided on the molding material (FIG. 3) and the molding material (301) is placed on the lower mold with inserting the hole-forming member (302) into the hole h0 (FIG. 3B).

The phrase that the molding material having the hole h0 is disposed in the mold so as to correspond to the hole-forming member specifically means that the hole-forming member is disposed with passing though the hole h0 of the molding material.

Figure 5A:
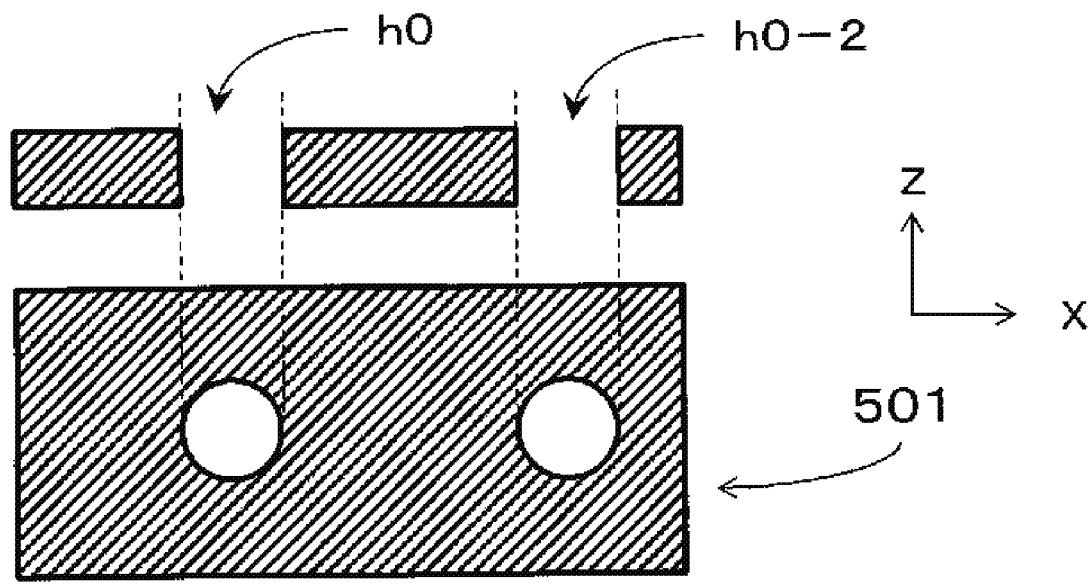
FIG. 5 is a schematic view illustrating a method for producing an example of the molded article having two holes.
Figure 5B:
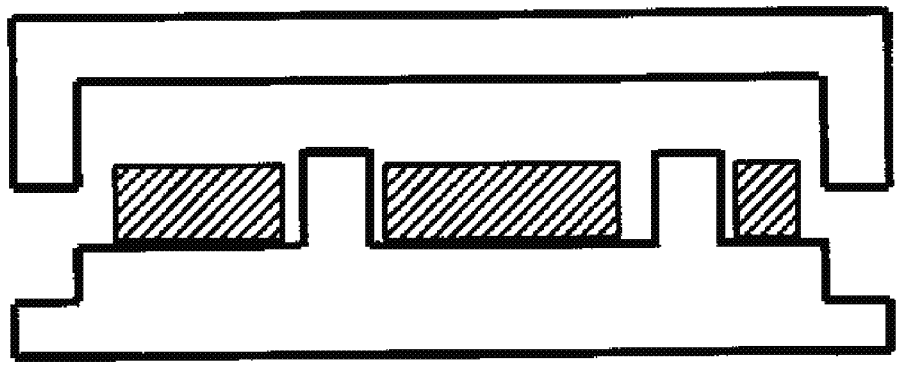
Figure 5C:
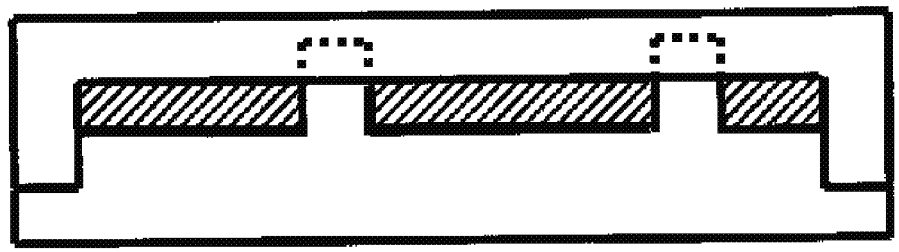

After the molding material where the hole-forming member 302 has been inserted into the hole h0 is disposed on the cavity face of the lower mold 303, descent of the upper mold 304 is started. With the descent of the upper mold, the end face of the hole-forming member provided on the lower mold comes into contact with the molding face of the upper mold and, when the descent is further continued, the hole-forming member is stored in a storage part (not shown in the figure) of the hole-forming member, which has been provided on the upper mold (304 in FIGS. 3 and 5) in advance and the molding material (301) flows, so that a molded article having the hole h1 is produced.

After the completion of the molding, the molded article having the hole h1 is obtained by opening the both male and female molds and taking out the molded article.

(Method of Disposing Molding Material)

At the time of disposing the molding material having a thickness t (e.g., 301 in FIG. 3) in the mold, it is preferred that the average distance Lf between the inner wall face W0 of the hole h0 of the molding material and the hole-forming member satisfies 0<Lf<10t. This means that, in the case where the thickness of the molding material is large, a flow distance of the molding material can be lengthened. For example, when the thickness of the molding material is 2.5 mm, the average distance Lf may satisfy 0<Lf<25 mm.

An upper limit of the average distance Lf is more preferably less than 7 t, further preferably less than 6 t, even more preferably 3 t or less.

Incidentally, the thickness t of the molding material is not particularly limited but usually, is preferably in the range of 0.01 mm to 100 mm, preferably in the range of 0.01 mm to 10.0 mm, more preferably in the range of 0.1 mm to 5.0 mm.

In the case where the molding material to be used in the invention has a structure that a plurality of layers are laminated, the above thickness t does not refer to the thickness of each layer but refers to the thickness of the whole molding material with summing up the thickness of each layer. The molding material in the invention may have a single layer structure composed of a single layer or may have a laminated structure where a plurality of layers are laminated. The embodiment where the molding material has the above laminated structure may be an embodiment where a plurality of layers having the same composition are laminated or an embodiment where a plurality of layers having compositions different from one another are laminated.

Moreover, at the time of disposing the molding material (e.g., 301 in FIG. 3) in the mold, it is more preferred that the average distance Lf between the inner wall face W0 of the hole h0 of the molding material and the hole-forming member is more than 0 and the maximum fiber length Lmax or less.

The distance between the inner wall face W0 of the hole h0 of the molding material and the hole-forming member is a distance from the inner wall face W0 to the hole-forming member, for example, as shown by 305 in FIG. 3B. Even when the hole-forming member (302) and the hole h0 have indefinite shapes, or when the hole-forming member (302) is unevenly disposed, the distances from the inner wall face W0 to the hole-forming member is averaged as the average distance thereof.

(Lower Limit of Average Distance Lf)

A lower limit of the average distance Lf between an inner wall face W0 of the hole h0 of the molding material and the hole-forming member is more preferably one tenth or more of the maximum fiber length Lmax, further preferably 3 mm or more, even more preferably 5 mm or more.

In a case where the average distance Lf between the inner wall face W0 of the hole h0 of the molding material and the hole-forming member is controlled to more than 0 mm when the molding material is disposed in the mold, the inner wall face W0 of the hole h0 approaches to the hole-forming member while the carbon fibers and the resin both flow at molding, thereby the inner wall face W1 of the hole h1 of the molded article is formed. At this time, for example, in the case of using a molding material where the carbon fibers are randomly dispersed in two dimensions in the in-plane directions, the flowing portion is changed into a state that the carbon fibers are oriented to three-dimensional direction including the plate thickness direction (Z direction in FIG. 2). On the other hand, in the portion where the molding material is not molded with flowing (portion that hardly moves before and after molding), the carbon fibers are maintained in a state that they are randomly dispersed in two dimensions in the in-plane directions.

As a result of the orientation of the carbon fibers to the plate thickness direction in the flowing portion, there is obtained a molded article where the linear expansion coefficient C1 of the periphery of the hole h1 (in the region a) in the plate thickness direction and the linear expansion coefficient C2 of the molded article region other than the region a in the plate thickness direction satisfies a relation of C1/C2<1.

This result is similarly obtained even when not the molding material where the carbon fibers are randomly dispersed in two dimensions but a molding material where the carbon fibers are arranged to one direction is used. That is, the carbon fibers are oriented also to the plate thickness direction in the region a but, in the molded article region other than the region a, the carbon fibers have a state that they are oriented to one direction when the molding is completed. Therefore, there is obtained the molded article where the relationship between the linear expansion coefficient C1 of the periphery (region a) of the hole h1 in the plate thickness direction and the linear expansion coefficient C2 of the molded article region other than the region a in the plate thickness direction satisfies C1/C2<1 (having an orientation in one direction).

Incidentally, in order to form the inner wall face W1 of the hole h1 of the molded article as a result of approach of the inner wall face W0 of the hole h0 to the hole-forming member while the carbon fibers and the resin both flow at molding, as mentioned above, it is preferred that the carbon fibers are preferably a mixture of carbon fiber bundles (A) each constituted by single fibers of a critical single fiber number or more, the critical single fiber number being defined by the above formula (1), and carbon fiber bundles (B1) each constituted by single fibers of less than the critical single fiber number and/or single carbon fibers (B2), the proportion of the carbon fiber bundles (A) to all the fibers is preferably more than 5 Vol % and less than 99 Vol %, and the average number (N) of single fibers in the carbon fiber bundles (A) preferably satisfies the requirement of the above formula (2).

(Upper Limit of Average Distance Lf)

An upper limit of the average distance Lf between the inner wall face W0 of the hole h0 of the molding material and the hole-forming member is preferably 10t (t is thickness of the molding material) or less, more preferably the maximum fiber length Lmax or less, even more preferably 30 mm or less, particularly preferably 20 mm or less. When flowing is performed at the maximum fiber length Lmax or less, it is advantageous in view that the disposition of the molding material in the mold becomes convenient and also at least one discontinuous fiber almost completely moves the flow distance, so that the carbon fibers can be more surely oriented to the plate thickness direction in the region a.

(Further Advantage of Above Production Method)

In the case where the aforementioned preferable molding method is adopted, not only production efficiency is improved but also the accuracy of the hole is improved as compared with the case where a hole is provided on a molded article by cutting.

That is, in the case of mass production of the molded article, a cutting step of cutting individual molded articles can be omitted by providing the hole at the time of molding. Furthermore, since the volume fraction of the fibers at the periphery (region a) of the hole h1 is relatively high, dimensional stability is good and high circularity of the hole provided on the molded article is maintained.

(Projection Area of Hole h0)

The projection area of the hole h0 that is a size of the hole h0 is preferably 101% or more and 2,000% or less of the projection area of the hole-forming member. The projection area is a projection area to the drawing direction of the molds and is the Z direction shown in FIG. 3A.

In the case where a relationship between the projection area of the hole h0 and the projection area of the hole-forming member falls within the above range, workability at the time of molding the molding material is excellent and the hole accuracy in the molded article and strength of the periphery of the hole (strength of the region a) can be improved. When the projection area of the hole h0 is 101% or more of the projection area of the hole-forming member, it becomes easy to dispose the hole h0 possessed by the molding material to the hole-forming member and a problem that the periphery of the hole h1 after molding becomes thick is less prone to occur. On the other hand, when the projection area of the hole h0 is 2,000% or less of the projection area of the hole-forming member, the periphery of the hole is less prone to be thinned, variation in the distance between the hole h0 and the hole-forming member is less prone to occur, and thus it becomes easy to keep the hole accuracy.

Further, in the case where the hole-forming member is provided on the lower mold, fixing force of the molded article to the lower mold can be enhanced, the position of the molded article at the opening of the molds becomes definite, and thus the take-out of the molded article can be stably performed. Thereby, the method for producing the molded article can have an excellent process passing ability.

The projection area of the hole h0 is preferably 105% or more and 1,700% or less, more preferably 110% or more and 1,500% or less of the projection area of the hole-forming member.

EXAMPLES

Hereinafter, the present invention will be specifically described with reference to Examples and the invention should not be construed as being limited thereto.

1. The raw materials used in the following Production Examples and Examples are as follows. Incidentally, decomposition temperature is a result measured by thermogravimetric analysis.

PAN-Based Carbon Fibers

Carbon fiber "Tenax" (registered trademark) STS40-24K (average fiber diameter: 7 μm) manufactured by Toho Tenax Co., Ltd.

Polyamide-6

Hereinafter, it is sometimes abbreviated as PA6.

Crystalline resin, Melting point: 225° C., Decomposition temperature (in air): 300° C., Linear expansion coefficient: $10 \times 10^{-5}$/° C.

2. Individual values in the present Examples were determined according to the following methods.

(1) Analysis of Volume Fraction (Vf) of Carbon Fibers

A molded article was heated at 500° C. for 1 hour in a furnace to burn and remove the thermoplastic resin and mass of the sample before and after the treatment was weighed, thereby mass of the carbon fiber fraction and the thermoplastic resin were calculated. Then, using specific gravity of each component, the volume fractions of the carbon fibers and the thermoplastic resin were calculated. As for a molding material, the volume fraction of the carbon fibers contained is also represented by Vf.

$$Vf=100 \times (\text{volume of carbon fibers})/[(\text{volume of carbon fibers})+(\text{volume of thermoplastic resin})] \quad \text{Formula (c)}$$

Incidentally, in the case where Vf (Vf1 and Vf2) of the region a and portions other than the region a were measured, each site of the molded article was cut and taken out and then measured.

(2) Analysis of Weight-Average Fiber Length of Carbon Fibers Contained in Molded Article As for the weight-average fiber length of the carbon fibers contained in a molded article, after the thermoplastic resin was removed at 500° C. for 1 hour in a furnace, length of each of 100 carbon fibers randomly extracted was measured to the unit of 1 mm by means of a vernier caliper and a loupe and recorded. From the lengths (Li where i is an integer of 1 to 100) of each of all the measured carbon fibers, the weight-average fiber length (Lw) was determined based on the following formula.

$$Lw=(\Sigma Li^2)/(\Sigma Li) \quad \text{Formula (b)}$$

Incidentally, the weight-average fiber length of the carbon fibers contained in a molding material can be also measured by the same method as mentioned above.

(3) Measurement of Linear Expansion Coefficient

After a test specimen was vacuum-dried at 110° C. for 24 hours as a pre-treatment, measurement was performed under the following measurement conditions.

Shape of test specimen: 2.5 mm (plate thickness direction)×5 mm (in-plane direction)×5 mm (in-plane direction)

Test machine model: TMA/SS7100 (manufactured by Seiko Instruments Inc.)

Temperature increasing rate: 5° C./min
Test load: Compression load of 49 mN
Probe diameter: 2.9 mm
Measurement atmosphere: under nitrogen atmosphere (100 ml/min)
Test temperature range: 25 to 200° C.

Incidentally, the compression direction at the time of measuring the linear expansion coefficient is each direction in the following samples (i) to (iii).

(i) Linear expansion coefficient C1: plate thickness direction in the region a (ii) Linear expansion coefficient C2: plate thickness direction in the molded article region other than the region a (iii) Linear expansion coefficient C3: in-plane direction in the molded article region other than the region a Moreover, in (i), four test specimens were cut out of the inner wall face W1 of the hole h1 toward outside of the normal direction of the inner wall face W1 and measured and then an average thereof was determined. In (ii) and (iii), a test specimens were cut out at the places 50 mm or more apart from the region a.

(4) As for strength of a fiber-reinforced resin molded article at the place not including the hole h1 and strength of a fiber-reinforced resin molded article at the place including the hole h1 (place including the region a), a dumbbell shape was cut out in accordance with JIS K7161:1994 and tensile strength was measured.

Moreover, a tensile strength decrease rate (%) at the place including the hole h1 with respect to the tensile strength at the place not including the hole h1 was calculated based on the following formula.

Tensile strength decrease rate (%)=[(Tensile strength at place not including hole $h1$)−(Tensile strength at place including hole $h1$)]÷(Tensile strength at portion not including hole $h1$)×100

(5) Evaluation of Fastening Stability

Two molded articles produced were prepared, laminated so as to overlap the holes h1, and caulked and fastened using a resin rivet to manufacture a fastened article. As the resin rivet, a clinch rivet (Nylon-6, manufactured by Mitsukawa Co., Ltd., Item No. CR32-2-1) was used.

After a cycle of heating the fastened article from ordinary temperature (20° C.) to 170° C. and then lowering the temperature was repeated 50 times, a thickness gauge of 100 μm or 180 μm was inserted into a clearance between the molded article and the rivet and fastening stability was evaluated.

Excellent: it was impossible to insert a thickness gauge of 100 μm.

Good: it was impossible to insert a thickness gauge of 180 μm but it was possible to insert a thickness gauge of 100 μm.

Bad: it was possible to insert a thickness gauge of 180 μm.

(6) Average Distance Lf Between Inner Wall Face W0 of Hole h0 of Molding Material and Hole-Forming Member The periphery of the hole h1 of a molded article produced was observed and a range where the molding material flowed was measured with a ruler. Distances were measured from the hole h1 (perfect circle) in the normal direction in 12 directions at even intervals and an average value (mm) was calculated. Incidentally, the range where the molding material flowed was visually confirmed.

(7) Evaluation of Accuracy of Hole h1

In each of Examples and Comparative Examples, 100 pieces of the molded article were produced and one hole h1 was each provided per one molded article, thus making 100 holes h1 in total. Using a CMM measuring machine (three-dimensional measuring machine, Coordinate Measuring Machine, LKV20. 15. 10 manufactured by Nikon Instech Co., Ltd.), of 100 holes h1 produced, an average diameter of the initial 10 holes h1 and an average diameter of the final 10 holes h1 were measured.

Production Example 1 Production of Molding Material

Carbon fibers "Tenax" (registered trademark) STS40-24KS (average fiber diameter: 7 μm, single yarn number: 24,000) manufactured by Toho Tenax Co., Ltd., which had been cut to an average fiber length of 20 mm were used as carbon fibers. Nylon-6 resin A1030 manufactured by Unichika, Ltd. was used. In accordance with the method described in U.S. Pat. No. 8,946,342, there was manufactured a molding material precursor of the carbon fibers and the Nylon-6 resin having a carbon-fiber areal weight of 1,456 g/m$^2$ and a Nylon-6 resin areal weight of 1,620 g/m$^2$, in which the carbon fibers had been randomly oriented in two-dimensions. The obtained molding material precursor was heated at 2.0 MPa for 5 minutes with a pressing device heated to 260° C. to obtain a molding material (i) having an average thickness of 2.5 mm.

With respect to the molding material obtained, the carbon fibers contained therein were analyzed. As a result, the following were found: the critical single fiber number defined by the above formula (1) was 86; the average number (N) of single fibers in carbon fiber bundles (A) each constituted by the single fibers of the critical single fiber number or more was 820; and the proportion of the carbon fiber bundles (A) each constituted by the single fibers of the critical single fiber number or more was 80 Vol % of all the carbon fibers. Moreover, the volume fraction (Vf) of the carbon fibers was 35%, the fiber lengths of the carbon fibers were constant, and the weight-average fiber length was 20 mm.

Production Example 2

After the molding material precursor was manufactured in the above Production Example 1, a portion of 60 mm×60 mm was cut out of the molding material precursor and a Nylon-6 resin pellet having the same shape and the same volume was disposed instead of the cut-out portion. These were heated at 2.0 MPa for 5 minutes with a pressing device heated to 260° C. to obtain a molding material (ii) having an average thickness of 2.5 mm. The molding material (ii) is one having a portion where a part of the molding material (i) is replaced by the Nylon-6 resin.

Production Example 3

Injection molding was performed using Nylon-6 resin A1030 anole, manufactured by Unichika Ltd. Thus, an injection-molded plate having an average thickness of 2.5 mm was prepared.

Production Example 4

A molding material was prepared in the same manner as in Example 1 except that the molding material precursor was manufactured with increasing the degree of opening of fibers at the time of manufacturing the molding material precursor, and the molding material was regarded as a molding material (iii). With respect to the molding material obtained, the carbon fibers contained therein were analyzed. As a result, the following were found: the critical single fiber number defined by the above formula (1) was 86; the average number (N) of single fibers in carbon fiber bundles (A) each constituted by the single fibers of the critical single fiber number or more was 420; and the proportion of the carbon fiber bundles (A) each constituted by the single fibers of the critical single fiber number or more was 35 Vol % of all the carbon fibers. Moreover, the volume fraction (Vf) of the carbon fibers was 35%, the fiber lengths of the carbon fibers were constant, and the weight-average fiber length was 20 mm.

Production Example 5

A molding material was prepared in the same manner as in Example 1 except that the molding material precursor was manufactured with increasing the degree of opening of fibers at the time of manufacturing the molding material precursor, and the molding material was regarded as a molding material (iv). With respect to the molding material obtained, the carbon fibers contained therein were analyzed. As a result, the following were found: the critical single fiber number defined by the above formula (1) was 86; the average number (N) of single fibers in carbon fiber bundles (A) each constituted by the single fibers of the critical single fiber number or more was 100; and the proportion of the carbon fiber bundles (A) each constituted by the single fibers of the critical single fiber number or more was 5 Vol % of all the carbon fibers. Moreover, the volume fraction (Vf) of the carbon fibers was 35%, the fiber lengths of the carbon fibers were constant, and the weight-average fiber length was 20 mm.

Production Example 6

A molding material was prepared in the same manner as in Production Example 1 except that the molding material precursor was manufactured with regulating the degree of opening of fibers at the time of manufacturing the molding material precursor, and the molding material was regarded as a molding material (v). With respect to the molding material obtained, the carbon fibers contained therein were analyzed. As a result, the following were found: the critical single fiber number defined by the above formula (1) was 86; the average number (N) of single fibers in carbon fiber bundles (A) each constituted by the single fibers of the critical single fiber number or more was 200; and the proportion of the carbon fiber bundles (A) each constituted by the single fibers of the critical single fiber number or more was 10 Vol % of all the carbon fibers. Moreover, the volume fraction (Vf) of the carbon fibers was 35%, the fiber length of the carbon fibers was constant, and the weight-average fiber length was 20 mm. The results are shown in Table 1.

Production Example 7

A molding material was prepared in the same manner as in Production Example 1 except that the molding material precursor was manufactured with adjusting the carbon fiber areal weight and the Nylon resin areal weight so that the average thickness of the molding material became 1 mm, and the molding material was regarded as a molding material (vi).

Example 1

The molding material (i) obtained in Production Example 1 was cut out into a size of 95 mm×195 mm and a hole h0 was provided at the position shown in FIG. 3. The diameter of the hole h0 was 40 mm After this was dried with a hot-air drier at 120° C. for 4 hours, it was heated to 275° C. with an infrared heater. As molds, molds having a flat molding cavity of 100 mm×200 mm were used, to which a hole-forming member was disposed at the position shown in FIG. 3. Incidentally, the projection area of the hole-forming member in the drawing direction of the molds was 137 mm$^2$. The shape of the hole-forming member when viewed from the drawing direction of the molds was a perfect circle having a diameter of 13.20 mm.

The temperature of the molds was set at 140° C., and the molding material which had been heated was introduced into the molds, and was pressed at a pressing pressure of 10 MPa for 1 minute to obtain a molded article having a hole h1 (perfect circle shape). Moreover, the operation was repeated 100 times to manufacture 100 pieces of the molded article having a hole h1 and the accuracy of the hole h1 was evaluated as mentioned above. The results are shown in Table 2.

Example 2

A molded article was obtained by performing press-molding in the same manner as in Example 1, except that the diameter of the hole h0 was changed to a diameter of 30 mm. The results are shown in Table 2.

Example 3

A molded article was obtained by performing press-molding in the same manner as in Example 1, except that the diameter of the hole h0 was changed to a diameter of 16 mm. The results are shown in Table 2.

Example 4

A molded article was obtained by performing press-molding in the same manner as in Example 1, except that the diameter of the hole h0 was changed to a diameter of 14 mm. The results are shown in Table 2.

Example 5

A molded article was obtained by performing press-molding in the same manner as in Example 1, except that molding material (iii) was used. The results are shown in Table 2.

Example 6

A molded article was obtained by performing press-molding in the same manner as in Example 1, except that molding material (v) was used. The results are shown in Table 2.

Example 7

A molded article was obtained by performing press-molding in the same manner as in Example 1, except that the diameter of the hole h0 was changed to 50 mm. The results are shown in Table 2.

Example 8

A molded article was obtained by performing press-molding in the same manner as in Example 1, except that the diameter of the hole h0 was changed to 62 mm. The results are shown in Table 3.

Example 9

A molded article was obtained by performing press-molding in the same manner as in Example 1, except that the diameter of the hole-forming member (perfect circle shape) was changed to 5.20 mm and the diameter of the hole h0 was changed to 30 mm. The results are shown in Table 3.

Example 10

A molded article was obtained by performing press-molding in the same manner as in Example 1, except that the diameter of the hole-forming member (perfect circle shape) was changed to 30.20 mm and the diameter of the hole h0 was changed to 62 mm. The results are shown in Table 3.

Example 11

Figure 7:
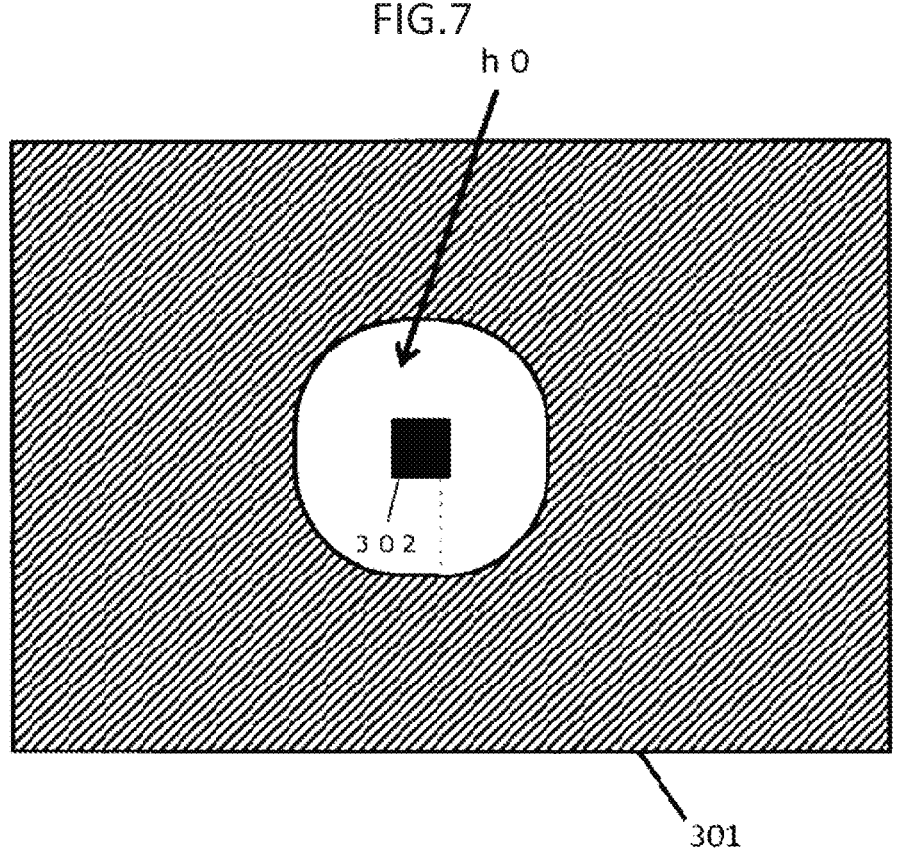
FIG. 7 is a schematic view illustrating a hole h0 of the molding material and the hole-forming member in Example 11.

The shape of the hole-forming member was made a square having a side of 6 mm and a molding material was disposed with providing a hole h0 along the shape of the hole-forming member so that a flow distance of the molding material became 10 mm (see FIG. 7). A molded article was obtained by performing press in the same manner as in Example 1, except the above. The results are shown in Table 4.

Example 12

Figure 8:
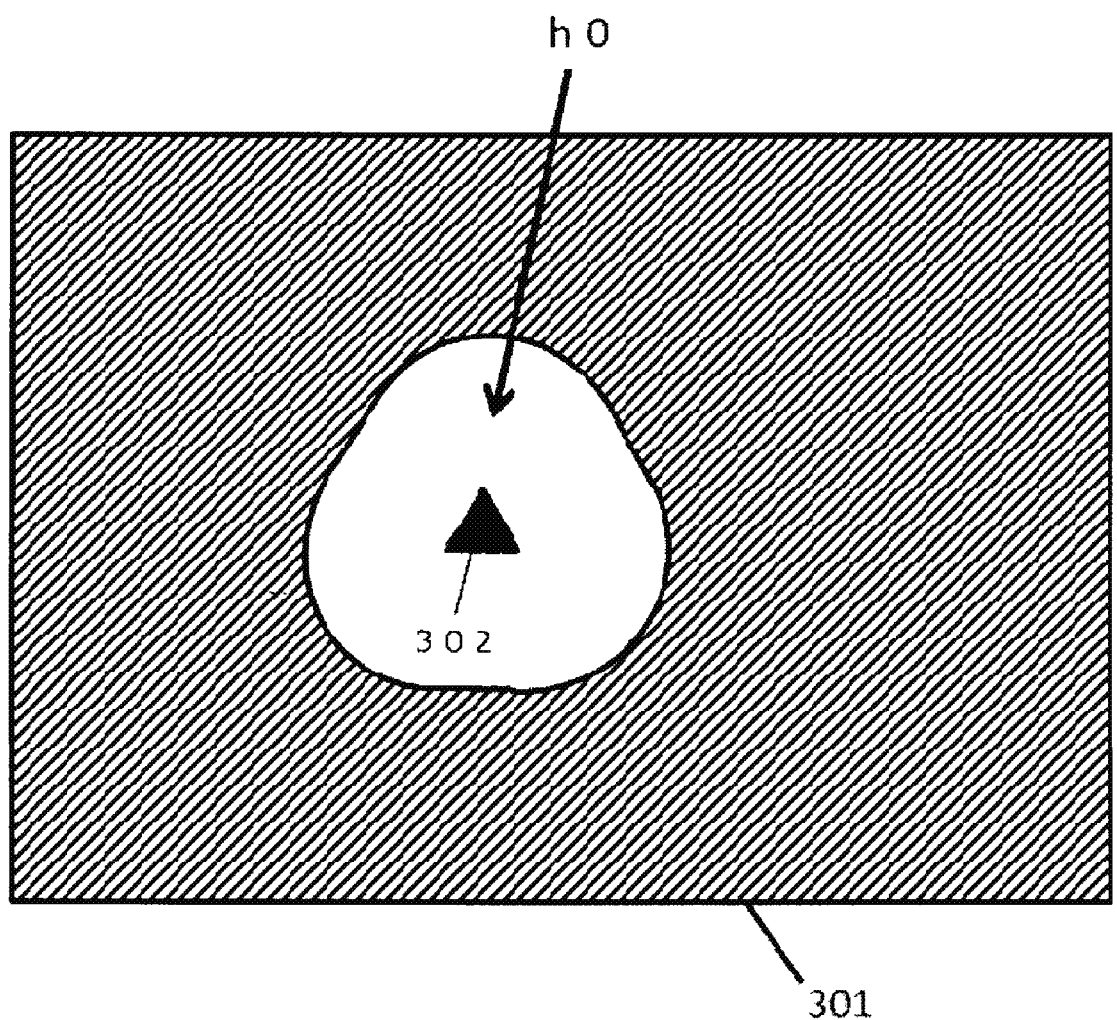
FIG. 8 is a schematic view illustrating a hole h0 of the molding material and the hole-forming member in Example 12.

The shape of the hole-forming member was made an equilateral triangle having a side of 6 mm and a molding material was disposed with providing a hole h0 along the shape of the hole-forming member so that a flow distance of the molding material became 10 mm (see FIG. 8). A molded article was obtained by performing press in the same manner as in Example 1, except the above. The results are shown in Table 4.

Example 13

A molded article was obtained by performing press in the same manner as in Example 1, except that the molding material (vi) was used and the diameter of the hole h0 (perfect circle shape) was changed to 14 mm. The results are shown in Table 4.

Example 14

A molded article was obtained by performing press in the same manner as in Example 1, except that two molding materials (i) were overlaid to change the thickness of the molding material to 5 mm. The results are shown in Table 4.

Example 15

A molded article was obtained by performing press in the same manner as in Example 1, except that four molding materials (i) were overlaid to change the thickness of the molding material to 10 mm and the diameter of the hole h0 (perfect circle shape) was changed to 150 mm. The results are shown in Table 4.

Comparative Example 1

The molding material (i) was cut out into a size of 95 mm×195 mm and a hole h0 was not provided. After it was dried with a hot-air drier at 120° C. for 4 hours, it was heated to 275° C. with an infrared heater. As molds, use was made of molds having a flat molding cavity of 100 mm×200 mm, to which a hole-forming member was not disposed. The temperature of the molds was set at 140° C., and the molding material which had been heated was introduced into the molds and was pressed at a pressing pressure of 10 MPa for 1 minute to obtain a molded article having no hole.

The obtained molded article was processed using a 3-axis machining center. Using an end mill having spiral cutting blades where a helix angle was 0°, a rake angle was 10°, the number of the blades (t) was 4, and a diameter was 6 mm, cutting was performed (a feed speed was 800 mm/min since the number of rotations was 8,000 (1/min)) to provide a perfect circular hole having a diameter of 13.2 mm on the molded article. Since the hole was provided by cutting, one step increased and the productivity was poor. The results are shown in Table 3.

Comparative Example 2

The molding material (ii) was cut out into a size of 95 mm×195 mm including the portion replaced by the Nylon-6 resin, and a hole h0 (diameter: 40 mm) was provided in the position shown in FIG. 3 at the portion (60 mm×60 mm) replaced by the Nylon-6 resin. After this was dried with a hot-air drier at 120° C. for 4 hours, it was heated to 275° C. with an infrared heater. Molds having a flat molding cavity of 100 mm×200 mm was used as molds, to which a hole-forming member was disposed in the position shown in FIG. 3. Incidentally, the projection area of the hole-forming member to the drawing direction of the molds was 137 mm².

The temperature of the molds was set at 140° C., and the molding material which had been heated was introduced into the molds, and was pressed at a pressing pressure of 10 MPa for 1 minute to obtain a molded article. Moreover, 100 pieces of the molded article were continuously cut with an end mill but the blades of the end mill was gradually worn on this occasion. As a result, at the time of making the final 10 pieces, the target perfect circular shape was not able to manufacture (smaller than the target perfect circular shape) due to wear. The results are shown in Table 3.

Comparative Example 3

The injection-molded plate obtained in Production Example 3 was subjected to cutting, using an end mill having spiral cutting blades where a helix angle was 0°, a rake angle was 10°, the number of the blades (t) was 4, and a diameter was 6 mm, cutting was performed (a feed speed was 800 mm/min since the number of rotations was 8,000 (1/min)) to provide a perfect circular hole having a diameter of 13 mm on the injection-molded plate. The results are shown in Table 3.

Comparative Example 4

A molded article was obtained by performing press-molding in the same manner as in Example 1, except that the molding material (iv) was used. The results are shown in Table 3.

TABLE 1

|  | Molding material | | | | | |
|---|---|---|---|---|---|---|
|  | Molding material (i) | Molding material (ii) | Molding material (iii) | Molding material (iv) | Molding material (v) | Molding material (vi) |
| Carbon fiber | | | | | | |
| Weight-average fiber length Lw (mm) | 20 | 20 | 20 | 20 | 20 | 20 |
| Maximum fiber length Lmax (mm) | 20 | 20 | 20 | 20 | 20 | 20 |
| Fiber form | Random in two dimensions | Random in two dimensions | Random in two dimensions | Random in two dimensions | Random in two dimensions | Random in two dimensions |
| Average fiber number (fibers) | 820 | 820 | 420 | 100 | 200 | 820 |
| Proportion of carbon fiber bundles (A) (Vol %) | 80 | 80 | 35 | 5 | 10 | 80 |
| Thermoplastic rein | | | | | | |
| Type | Polyamide-6 | Polyamide-6 | Polyamide-6 | Polyamide-6 | Polyamide-6 | Polyamide-6 |
| Linear expansion coefficient Cm ($\times 10^{-5}/°$ C.) | 10 | 10 | 10 | 10 | 10 | 10 |
| Average thickness (mm) | 2.5 | 2.5 | 2.5 | 2.5 | 2.5 | 1 |
| Notes |  | Nylon-6 resin alone in region a |  |  |  |  |

TABLE 2

|  | Example 1 | Example 2 | Example 3 | Example 4 | Example 5 | Example 6 | Example 7 |
|---|---|---|---|---|---|---|---|
| Molding material | (i) | (i) | (i) | (i) | (iii) | (v) | (i) |
| Hole h0 | | | | | | | |
| Shape | perfect circle | perfect circle | perfect circle | perfect circle | perfect circle | perfect circle | perfect circle |
| Diameter (mm) | 40 | 30 | 16 | 14 | 40 | 40 | 50 |
| Projection area (mm$^2$) | 1257 | 707 | 201 | 154 | 1257 | 1257 | 1963 |
| Hole-forming member | | | | | | | |
| Shape | perfect circle | perfect circle | perfect circle | perfect circle | perfect circle | perfect circle | perfect circle |
| Diameter (mm) | 13.20 | 13.20 | 13.20 | 13.20 | 13.20 | 13.20 | 13.20 |
| Projection area (mm$^2$) | 137 | 137 | 137 | 137 | 137 | 137 | 137 |
| Projection area of hole h0/Projection area of hole-forming member (%) | 918 | 517 | 147 | 112 | 918 | 919 | 1435 |
| Average distance Lf between inner wall face of hole h0 and hole-forming member (mm) | 13.4 | 8.4 | 1.4 | 0.4 | 13.4 | 13.4 | 18.4 |
| Thickness t of molding material (mm) | 2.5 | 2.5 | 2.5 | 2.5 | 2.5 | 2.5 | 2.5 |
| Lf/t | 5.36 | 3.36 | 0.56 | 0.16 | 5.36 | 5.36 | 7.36 |
| Molded article | | | | | | | |
| C1 ($\times 10^{-5}/°$ C.) | 7.5 | 7.7 | 23 | 24 | 8.5 | 9.0 | 7.5 |
| C2 ($\times 10^{-5}/°$ C.) | 28.5 | 28.5 | 28.5 | 28.5 | 28.5 | 28.5 | 28.5 |
| C1/C2 | 0.26 | 0.27 | 0.81 | 0.84 | 0.30 | 0.32 | 0.26 |
| C3 ($\times 10^{-5}/°$ C.) | 0.7 | 0.5 | 0.5 | 0.6 | 0.5 | 0.5 | 0.7 |
| Vf1 (Vol %) | 30 | 31 | 32 | 33 | 23 | 10 | 28 |
| Vf2 (Vol %) | 35 | 35 | 35 | 35 | 35 | 35 | 35 |
| Vf1/Vf2 | 0.85 | 0.89 | 0.92 | 0.94 | 0.66 | 0.29 | 0.80 |
| Evaluation | | | | | | | |
| Tensile strength of molded article (MPa) (place including hole h1) | 249 | 252 | 250 | 251 | 200 | 187 | 230 |
| Tensile strength of molded article (MPa) (place including no hole h1) | 300 | 300 | 300 | 300 | 350 | 400 | 300 |
| Tensile strength decrease ratio (%) | 17 | 16 | 17 | 16 | 43 | 53 | 23 |
| Fastening stability | Excellent | Excellent | Good | Good | Excellent | Excellent | Excellent |
| Evaluation of accuracy of hole h1 | | | | | | | |
| Average diameter of initial 10 holes (mm) | 13.19 | 13.19 | 13.19 | 13.19 | 13.19 | 13.19 | 13.19 |
| Average diameter of final 10 holes (mm) | 13.18 | 13.18 | 13.19 | 13.19 | 13.18 | 13.18 | 13.18 |

TABLE 3

| | Example 8 | Example 9 | Example 10 | Comparative Example 1 | Comparative Example 2 | Comparative Example 3 | Comparative Example 4 |
|---|---|---|---|---|---|---|---|
| Molding material | (i) | (i) | (i) | (i) | (ii) | — | (iv) |
| Hole h0 | | | | | | | |
| Shape | perfect circle | perfect circle | perfect circle | after completion of molding, molded article was subjected to cutting to provide hole | perfect circle | after completion of molding, molded article was subjected to cutting to provide hole | perfect circle |
| Diameter (mm) | 62 | 30 | 62 | | 40 | | 40 |
| Projection area (mm$^2$) | 3019 | 707 | 3019 | | 1257 | | 1257 |
| Hole-forming member | | | | | | | |
| Shape | perfect circle | perfect circle | perfect circle | | perfect circle | | perfect circle |
| Diameter (mm) | 13.20 | 5.20 | 30.20 | | 13.20 | | 13.20 |
| Projection area (mm$^2$) | 137 | 21 | 716 | | 137 | | 137 |
| Projection area of hole h0/Projection area of hole-forming member (%) | 2206 | 3328 | 421 | | 918 | | 918 |
| Average distance between inner wall face of hole h0 and hole-forming member Lf (mm) | 24.4 | 12.4 | 15.9 | | 13.4 | | 13.4 |
| Thickness t of molding material (mm) | 2.5 | 2.5 | 2.5 | 2.5 | 2.5 | 2.5 | 2.5 |
| Lf/t | 9.76 | 4.96 | 6.36 | — | 5.36 | — | 5.36 |
| Molded article | | | | | | | |
| C1 (×10$^{-5}$/° C.) | 7.5 | 7.5 | 7.5 | 28.5 | 10 | 10.0 | 9.5 |
| C2 (×10$^{-5}$/° C.) | 28.5 | 28.5 | 28.5 | 28.5 | 28.5 | 10.0 | 28.5 |
| C1/C2 | 0.26 | 0.26 | 0.26 | 1.0 | 0.35 | 1.00 | 0.33 |
| C3 (×10$^{-5}$/° C.) | 0.7 | 0.7 | 0.7 | 0.5 | — | 10.0 | — |
| Vf1 (Vol %) | 26 | 31 | 31 | 35 | 5 | 0 | 5 |
| Vf2 (Vol %) | 35 | 35 | 35 | 35 | 35 | 0 | 35 |
| Vf1/Vf2 | 0.74 | 0.89 | 0.89 | 1.0 | 0.14 | — | 0.14 |
| Evaluation | | | | | | | |
| Tensile strength of molded article (MPa) (place including hole h1) | 220 | 270 | Evaluation Was not conducted | 251 | 90 | 90 | 90 |
| Tensile strength of molded article (MPa) (place including no hole h1) | 300 | 300 | | 300 | 300 | 90 | 450 |
| Tensile strength decrease ratio (%) | 27 | 10 | | 16 | 70 | 0 | 80 |
| Fastening stability | Excellent | Excellent | Excellent | Bad | Excellent | Excellent | Excellent |
| Evaluation of accuracy of hole h1 | | | | | | | |
| Average diameter of initial 10 holes (mm) | 13.19 | 5.20 | 30.19 | 13.20 | — | — | — |
| Average diameter of final 10 holes (mm) | 13.18 | 5.20 | 30.18 | 13.15 | — | — | — |

TABLE 4

| | Example 11 | Example 12 | Example 13 | Example 14 | Example 15 |
|---|---|---|---|---|---|
| Molding material | (i) | (i) | (vi) | (i) 2 sheets | (i) 4 sheets |
| Hole h0 | | | | | |
| Shape | FIG. 7 | FIG. 8 | perfect circle | perfect circle | perfect circle |
| Diameter (mm) | — | — | 14 | 40 | 150 |
| Projection area (mm$^2$) | 590 | 494 | 154 | 1257 | 17671 |
| Hole-forming member | | | | | |
| Shape | square | equilateral triangle | perfect circle | perfect circle | perfect circle |
| Diameter (mm) | 6 | 6 | 13.20 | 13.20 | 13.20 |
| Projection area (mm$^2$) | 36 | 18 | 137 | 137 | 137 |
| Projection area of hole h0/Projection area of hole-forming member (%) | 1,639 | 2,744 | 112 | 918 | 12,913 |
| Average distance between inner wall face of hole h0 and hole-forming member Lf (mm) | 10 | 10 | 0.4 | 13.4 | 68.4 |
| Thickness t of molding material (mm) | 2.5 | 2.5 | 1 | 5 | 10 |
| Lf/t | 4 | 4 | 0.4 | 2.68 | 6.84 |
| Molded article | | | | | |
| C1 (×10$^{-5}$/° C.) | 7.6 | 7.6 | 26 | 16 | 5 |
| C2 (×10$^{-5}$/° C.) | 28.5 | 28.5 | 28.5 | 28.5 | 28.5 |
| C1/C2 | 0.27 | 0.27 | 0.91 | 0.56 | 0.18 |
| C3 (×10$^{-5}$/° C.) | 0.7 | 0.7 | 0.6 | 0.7 | 0.7 |
| Vf1 (Vol %) | 30 | 30 | 34 | 27 | 20 |

TABLE 4-continued

|  | Example 11 | Example 12 | Example 13 | Example 14 | Example 15 |
|---|---|---|---|---|---|
| Vf2 (Vol %) | 35 | 35 | 35 | 35 | 35 |
| Vf1/Vf2 | 0.86 | 0.86 | 0.97 | 0.77 | 0.57 |
| Evaluation |  |  |  |  |  |
| Tensile strength of molded article (MPa) (place including hole h1) | 230 | 200 | 251 | 220 | 195 |
| Tensile strength of molded article (MPa) (place including no hole h1) | 300 | 300 | 300 | 300 | 300 |
| Tensile strength decrease ratio (%) | 23 | 33 | 16 | 27 | 35 |
| Fastening stability | Excellent | Excellent | Good | Good | Excellent |
| Evaluation of accuracy of hole h1 |  |  |  |  |  |
| Average diameter of initial 10 holes (mm) | — | — | 13.19 | 13.19 | 13.19 |
| Average diameter of final 10 holes (mm) | — | — | 13.18 | 13.18 | 13.18 |

INDUSTRIAL APPLICABILITY

The molded articles and the production method of the present invention can be used for various constituent members, for example, interior or exterior boards and constituent members for automobiles, and for frames or housings of various electrical products or machines, or the like. Preferably, they can be utilized as automobile parts.

While the invention has been described in detail and with reference to specific embodiments thereof, it will be apparent to one skilled in the art that various changes and modifications can be made therein without departing from the spirit and scope thereof.

The present application is based on Japanese Patent Application No. 2015-176617 filed on Sep. 8, 2015, and the contents are incorporated herein by reference.

DESCRIPTION OF REFERENCE NUMERALS AND SIGNS

101 Molded article
201 Range representing region a
301 Molding material provided with hole h0
302 Hole-forming member
303 Lower mold of molds
304 Upper mold of molds
305 Distance between inner wall face W0 of hole h0 of molding material and hole-forming member
501 Molding material provided with hole h0 and hole h0-2
601 Fastened article where two molded articles each provided with hole h1 in the invention are overlaid and fastened
602 Fastening rod caulked using resin rivet
h0 Hole provided on molding material
h0-2 Second hole other than hole h0, provided on molding material
h1 Hole provided on molded article
h1-2 Second hole other than hole h1, provided on molded article
W1 Inner wall face
W2 Imaginary outer wall face
W0 Inner wall face of hole h0 of molding material

The invention claimed is:

1. A molded article comprising discontinuous carbon fibers and a thermoplastic resin, the molded article being provided with a hole h1, the molded article having a region a between an inner wall face W1 of the hole h1 and an imaginary outer wall face W2 depicted in parallel to the inner wall face W1 and having a distance Lw from the inner wall face W1, the distance Lw being a weight average fiber length of the discontinuous carbon fibers,
   wherein a linear expansion coefficient C1 of the region a in the plate thickness direction and a linear expansion coefficient C2 of a molded article region other than the region a in the plate thickness direction satisfies a relation of C1/C2<1, and
   a volume fraction Vf1 of the carbon fibers in the region a and a volume fraction Vf2 of the carbon fibers in the molded article region other than the region a satisfies a relation of 0.2<Vf1/Vf2<1.

2. The molded article according to claim 1, wherein the volume fraction Vf1 of the carbon fibers in the region a and the volume fraction Vf2 of the carbon fibers in the molded article region other than the region a satisfies a relation of 0.2<Vf1/Vf2<1.2.

3. The molded article according to claim 1, wherein the linear expansion coefficient Cm of the thermoplastic resin satisfies Cm/C2<1.

4. The molded article according to claim 1, wherein the linear expansion coefficient C1 is $22 \times 10^{-5}/°$ C. or less.

5. The molded article according to claim 1, wherein the weight-average fiber length Lw of the carbon fibers is 1 to 100 mm.

6. The molded article according to claim 5, wherein the carbon fibers contained in the molded article region other than the region a are randomly dispersed in two-dimensions within in-plane directions; and
   the molded article region other than the region a has a linear expansion coefficient C3 in the in-pane direction of more than 0 and $2.0 \times 10^{-5}/°$ C. or less.

7. The molded article according to claim 1, wherein, the carbon fibers contained in the molded article are mixture of carbon fiber bundles (A) each constituted by single fibers of a critical single fiber number defined by the following formula (1) or more, and carbon fiber bundles (B1) each constituted by single fibers of less than the critical single fiber number and/or single carbon fibers (B2), a proportion of the carbon fiber bundles (A) to all the fibers is more than 5 Vol % and less than 99 Vol %, and an average number (N) of single fibers in the carbon fiber bundles (A) satisfies the requirement of the following formula (2):

$$\text{Critical single fiber number} = 600/D \quad (1)$$

$$0.6 \times 10^4/D^2 < N < 6 \times 10^5/D^2 \quad (2)$$

where D is an average fiber diameter (μm) of the carbon fibers.

8. The molded article according to claim 1, wherein the volume fraction Vf1 and the volume fraction Vf2 satisfies a relation of $0.2<Vf1/Vf2\leq0.97$.

* * * * *